(12) United States Patent
Brockmeier

(10) Patent No.: US 7,377,221 B1
(45) Date of Patent: May 27, 2008

(54) TWIN ROW PLANTER WITH ADJUSTABLE SEED METERING

(75) Inventor: Gary G. Brockmeier, Lenexa, KS (US)

(73) Assignee: Monosem, Inc., Lenexa, KS (US)

( * ) Notice: Subject to any disclaimer, the term of this patent is extended or adjusted under 35 U.S.C. 154(b) by 56 days.

(21) Appl. No.: 11/558,551

(22) Filed: Nov. 10, 2006

(51) Int. Cl.
*A01C 7/00* (2006.01)
*A01C 9/00* (2006.01)

(52) U.S. Cl. .................................... 111/184; 111/900

(58) Field of Classification Search ........ 111/177–188, 111/200, 900
See application file for complete search history.

(56) References Cited

U.S. PATENT DOCUMENTS 6,070,539 A * 6/2000 Flamme et al. ............. 111/177

* cited by examiner

*Primary Examiner*—Christopher J. Novosad
(74) *Attorney, Agent, or Firm*—Hovey Williams LLP

(57) ABSTRACT

A twin row planter comprises a drive and a pair of planter units powered by the drive. The planter units include seed metering wheels that are synchronized to discharge seeds in a predetermined staggered pattern along a harvesting row. One of the planter units is adjustable relative to the drive so as to achieve the desired pattern. In particular, the adjustable planter unit includes a connector that is configurable into a plurality of discrete indexing positions. The connector positions determine the relative angular offset between the metering wheels and, thereby, control the spacing of seed within the pattern.

40 Claims, 14 Drawing Sheets

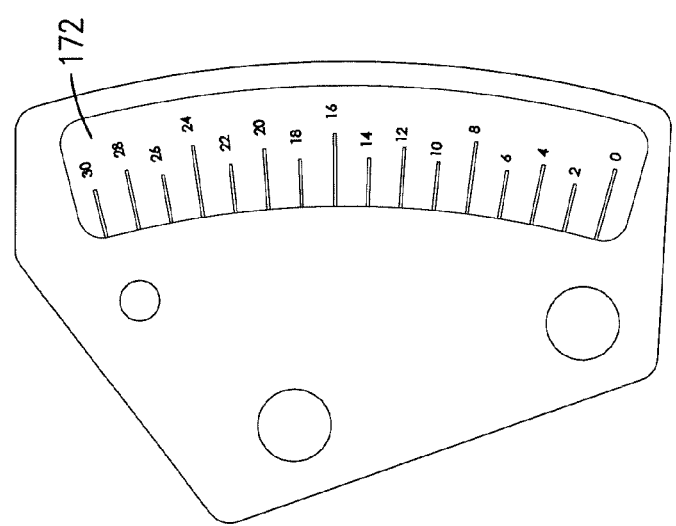
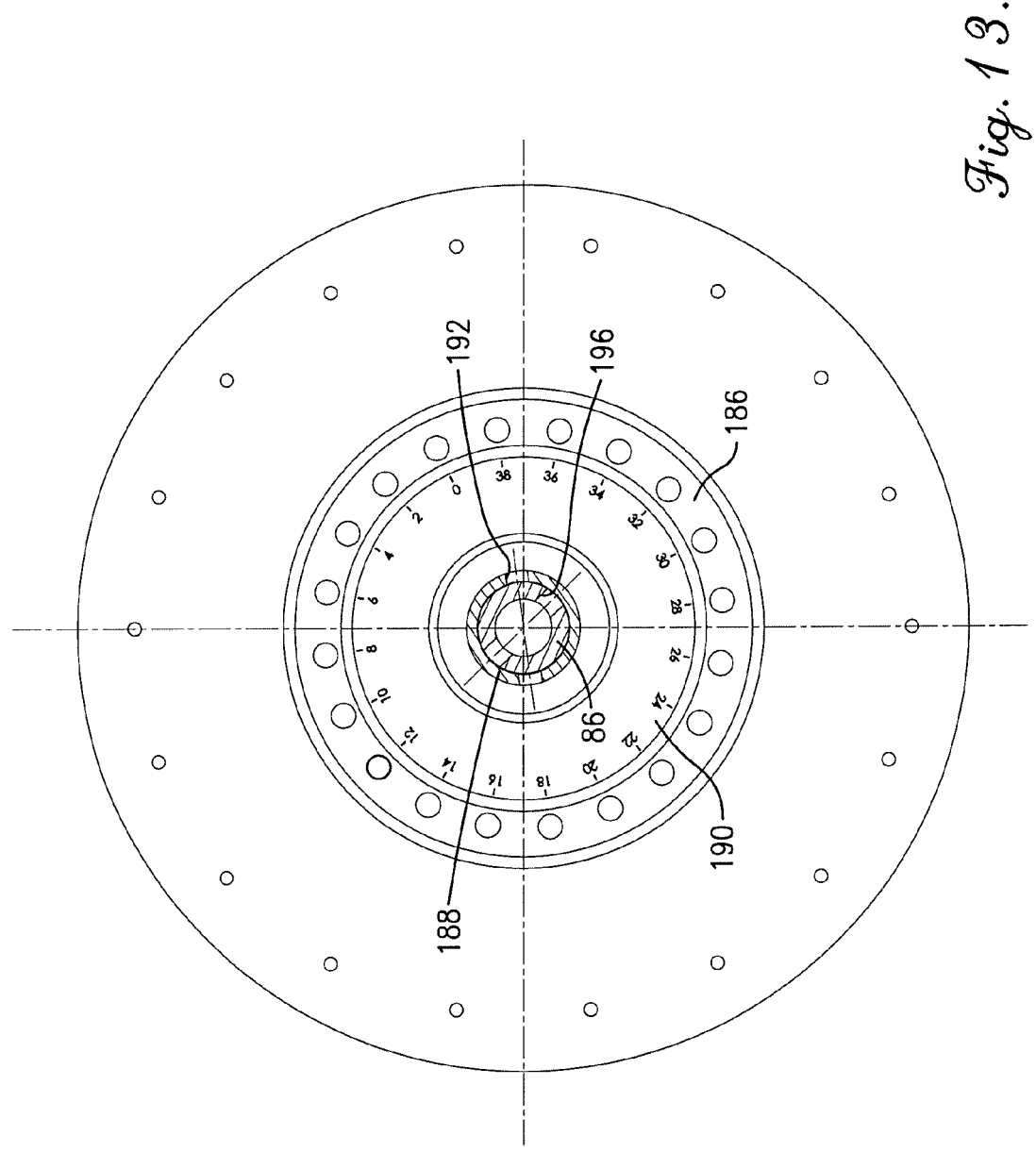
Fig. 13.

TWIN ROW PLANTER WITH ADJUSTABLE SEED METERING

BACKGROUND OF THE INVENTION

1. Field of the Invention

The present invention relates generally to agricultural planting equipment. More specifically, an embodiment of the present invention concerns a twin-row planter including relatively adjustable seed metering assemblies of each planting unit pair for permitting selective variance of the seed stagger in the adjacent furrows.

2. Discussion of Prior Art

Conventional row-crop planters include a plurality of planter units for planting seeds along spaced-apart rows. Some of these conventional planters include a single planter unit per row that plants seeds along a single furrow. Other planters known in the art include two planters per row and are referred to as twin row seed planters. Twin row planters enable the placement of seed along two closely-spaced furrows within the corresponding row. In particular, twin row planters can discharge seeds into an alternating pattern between adjacent furrows within the row, i.e., the two planters alternately position seed. In this manner, twin row planters enable a greater number of seeds to be planted along the row than single row planters while maintaining the necessary spacing between individual seeds.

Twin row planters are problematic and suffer from various undesirable limitations. It is highly desirable to have the seeds in the closely-spaced furrows to be relatively positioned in a desired pattern. Typically, this pattern constitutes equidistant spacing (i.e., uniform staggering) of the seeds between the furrows. However, the problem is that if the speed of the drive mechanism relative to the ground speed is changed, the stagger between adjacent furrows changes. In some instances, seeds from the two furrows could be placed immediately adjacent one another. With prior art twin row planters, users have attempted to reconfigure the seed stagger between furrows by adjusting the transmission that interconnected the planter units. In particular, users would shift a drive chain from one position to another on a corresponding sprocket by "jumping the chain off the sprocket." This technique is problematic because the step of repositioning the chain fails to indicate the resulting seed stagger pattern. As a consequence, the user of this method typically must observe the pattern resulting from the chain adjustment and then, if necessary, make additional adjustments to the transmission to achieve the desired pattern. This iterative method requires guesswork by the user and is commonly very time consuming, imprecise, and difficult to repeat for subsequent planter pairs.

SUMMARY OF THE INVENTION

The present invention provides a twin row seed planter that does not suffer from the problems and limitations of the prior art planters set forth above.

A first aspect of the present invention concerns a twin row seed planter broadly including a pair of planting units and a drive mechanism. The pair of planting units is operable to seed a pair of closely-spaced adjacent furrows forming a single harvesting row. A first one of the planting units corresponds with a first one of the furrows and a second one of the planting units corresponds with a second one of the furrows. The first planting unit includes a first rotatable metering wheel having a plurality of circumferentially spaced seed-receiving first cells. The second planting unit includes a second rotatable metering wheel having a plurality of circumferentially spaced seed-receiving second cells. The second metering wheel is positioned relative to the first metering wheel to present an angular relationship between the first and second cells. The drive mechanism is operable to supply power to the planting units so as to cause rotation of the wheels. The second metering wheel is drivingly disconnectable from the drive mechanism and repositionable relative to the first metering wheel to adjust the angular relationship between the first and second cells so as to vary spacing of the seed in the second furrow relative to seed in the first furrow.

A second aspect of the present invention concerns a method of adjusting the seed stagger between a pair of closely-spaced adjacent furrows planted by respective planting units of a twin row planter, wherein each of the planting units includes a rotatable seed metering wheel. The seed stagger adjustment method broadly includes the steps of determining an initial angular relationship between the seed metering wheels of the planting units, comparing the initial angular relationship with an adjusted angular relationship corresponding to a desired seed stagger between the furrows, and relatively shifting the seed metering wheels from the initial angular relationship to the adjusted angular relationship.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 14:
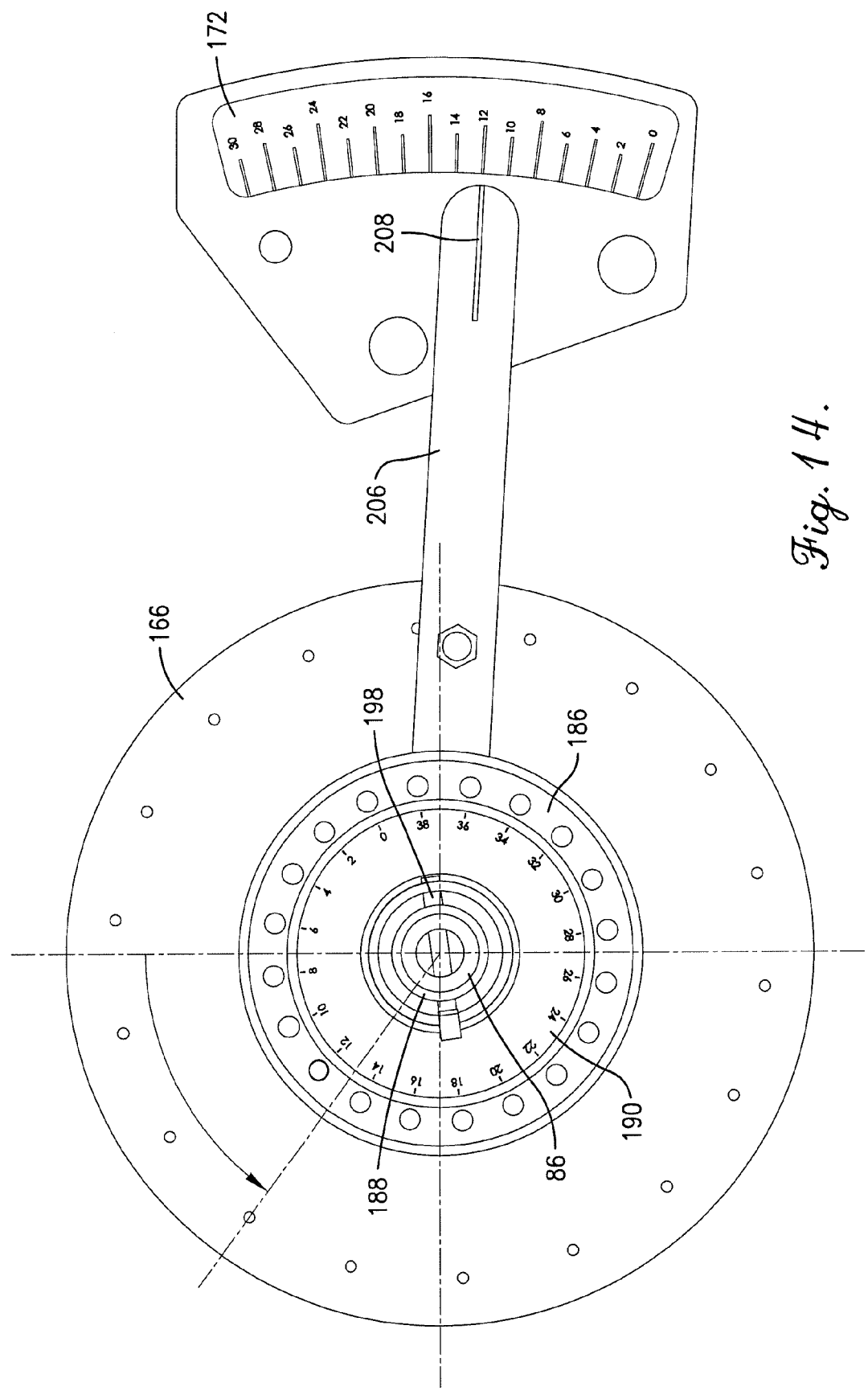

FIG. 13 is an enlarged fragmentary left side view of the seed metering assembly shown in FIGS. 1-7, 11, and 12, showing the timing disk and timing scale shifted in a counterclockwise direction for changing the angular offset of the seed metering assemblies to a value of twelve (12); and FIG. 14 is an enlarged fragmentary left side view of the seed metering assembly shown in FIGS. 1-7 and 11-13, showing the metering wheel and rotatable shaft shifted in a counterclockwise direction to the angular offset value of twelve (12).

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
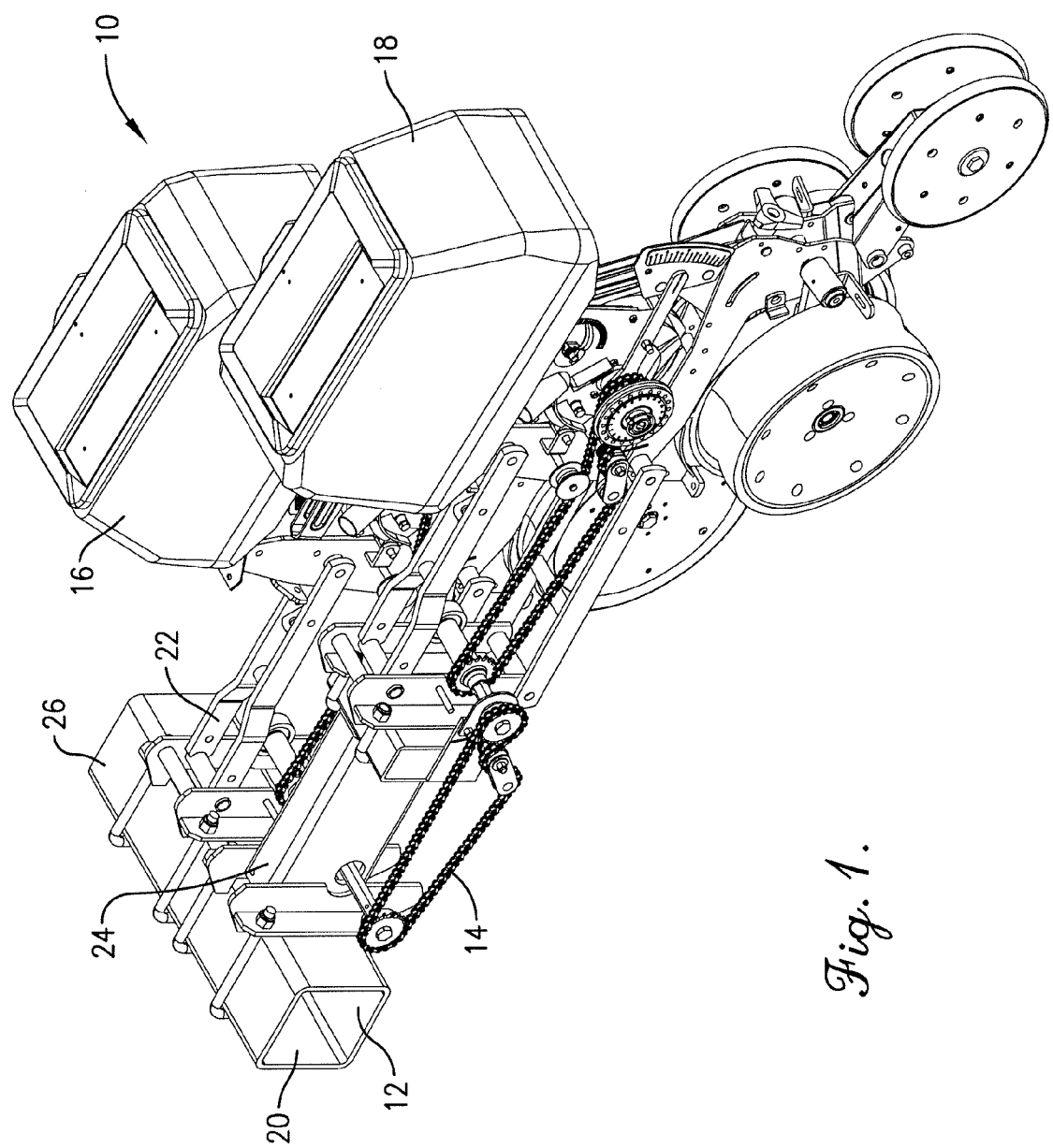
FIG. 1 is a fragmentary perspective view of a twin row planter constructed in accordance with a preferred embodiment of the present invention.
Figure 2:
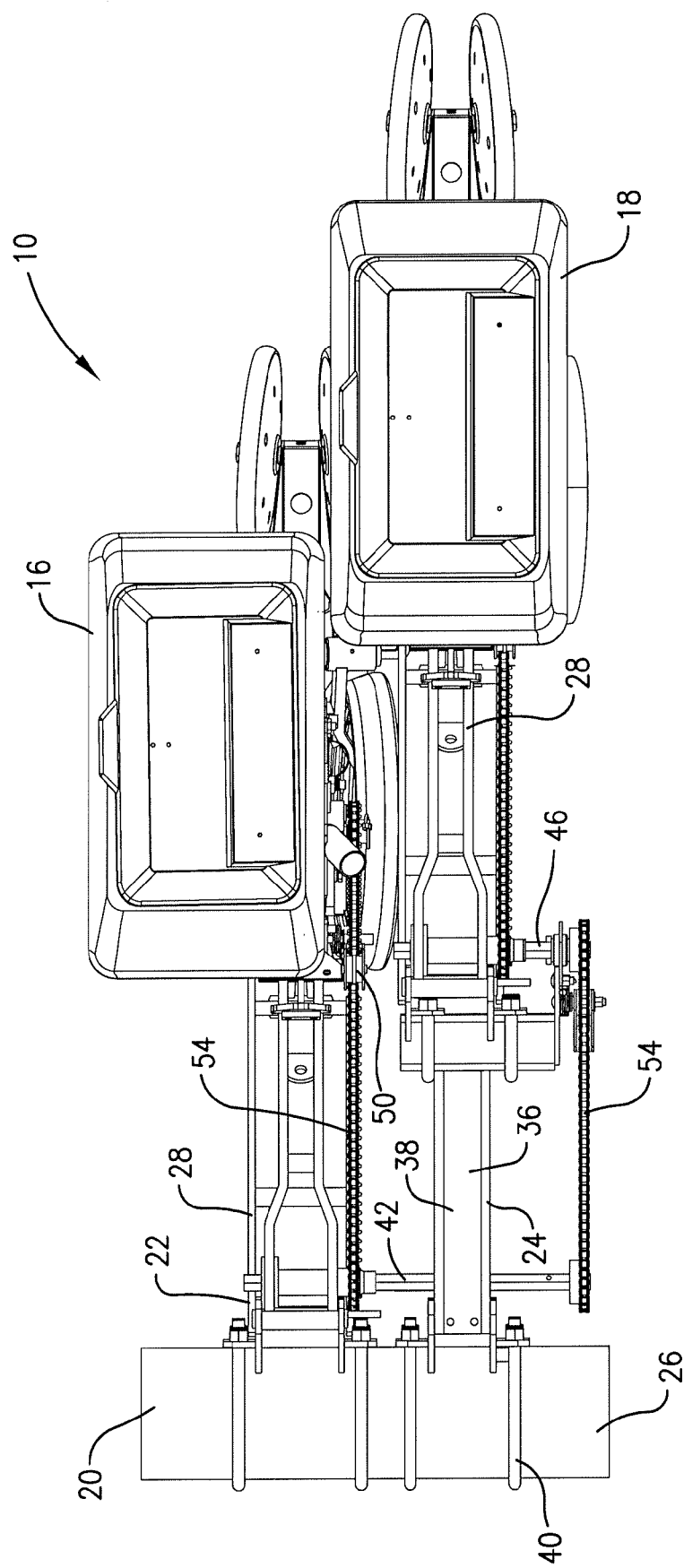
FIG. 2 is a top view of the twin row planter shown in FIG. 1.
Figure 3:
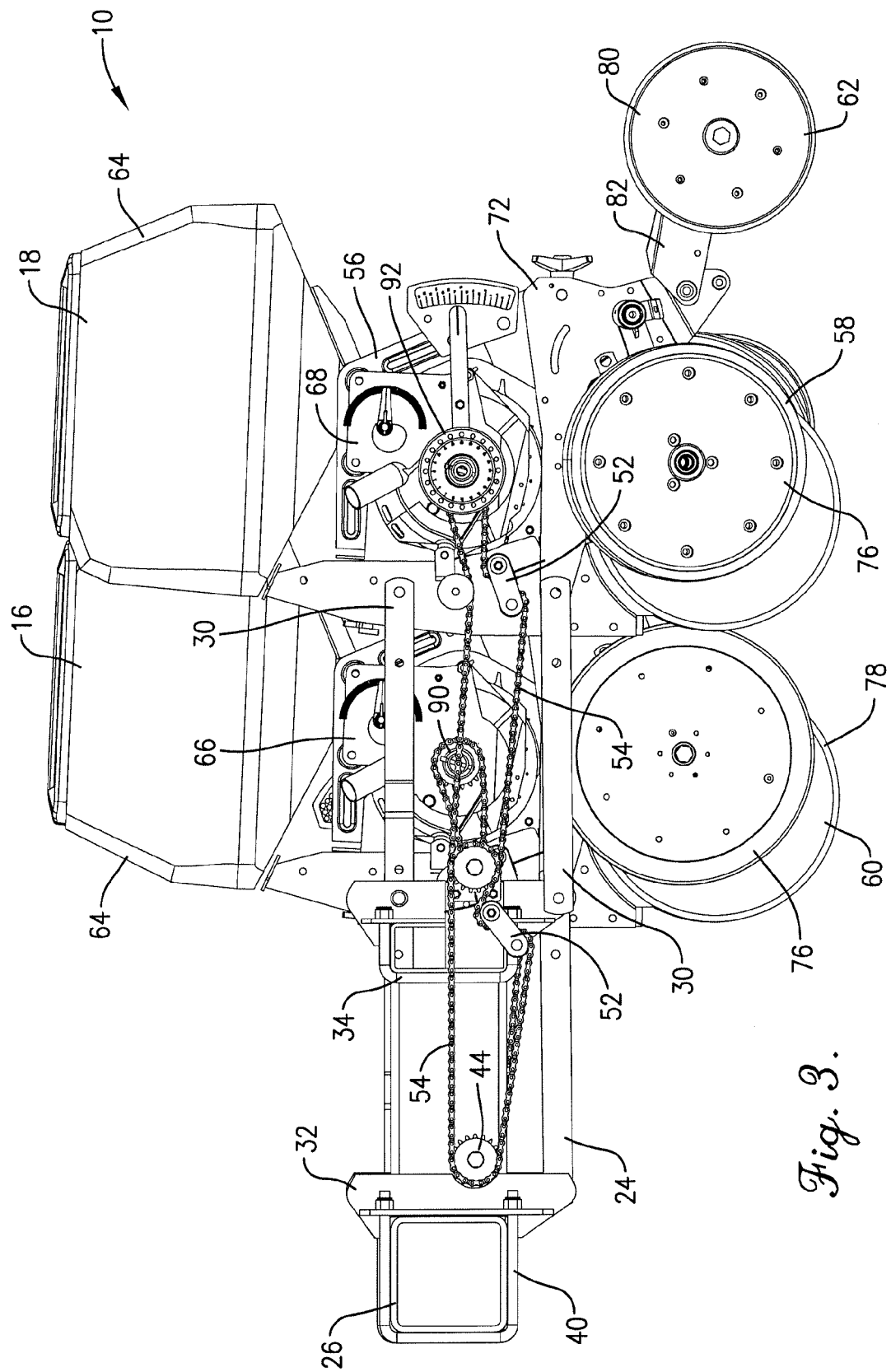
FIG. 3 is a left side view of the twin row planter shown in FIGS. 1 and 2.
Figure 4:
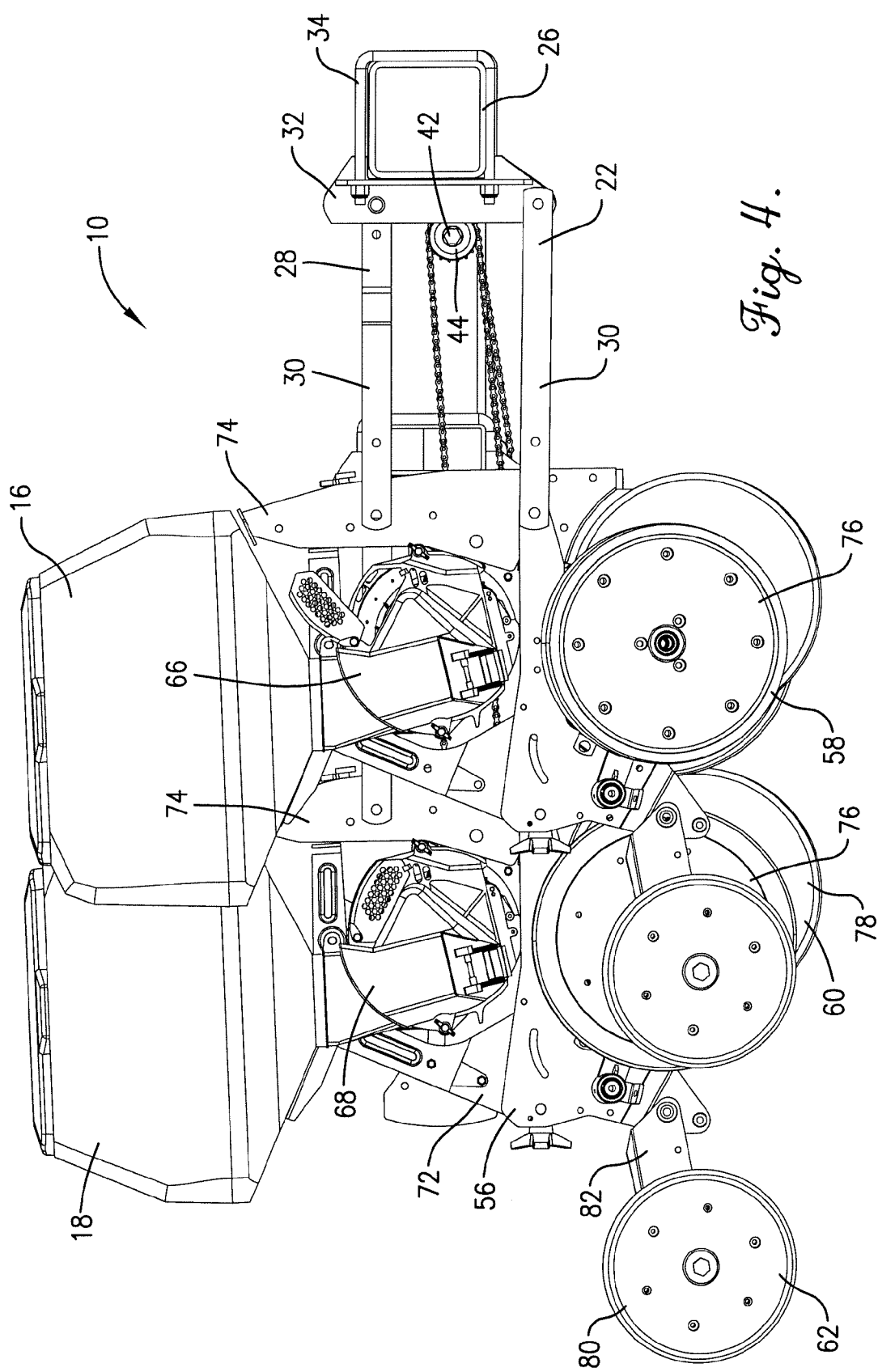
FIG. 4 is a right side view of the twin row planter shown in FIGS. 1-3.
Figure 5:
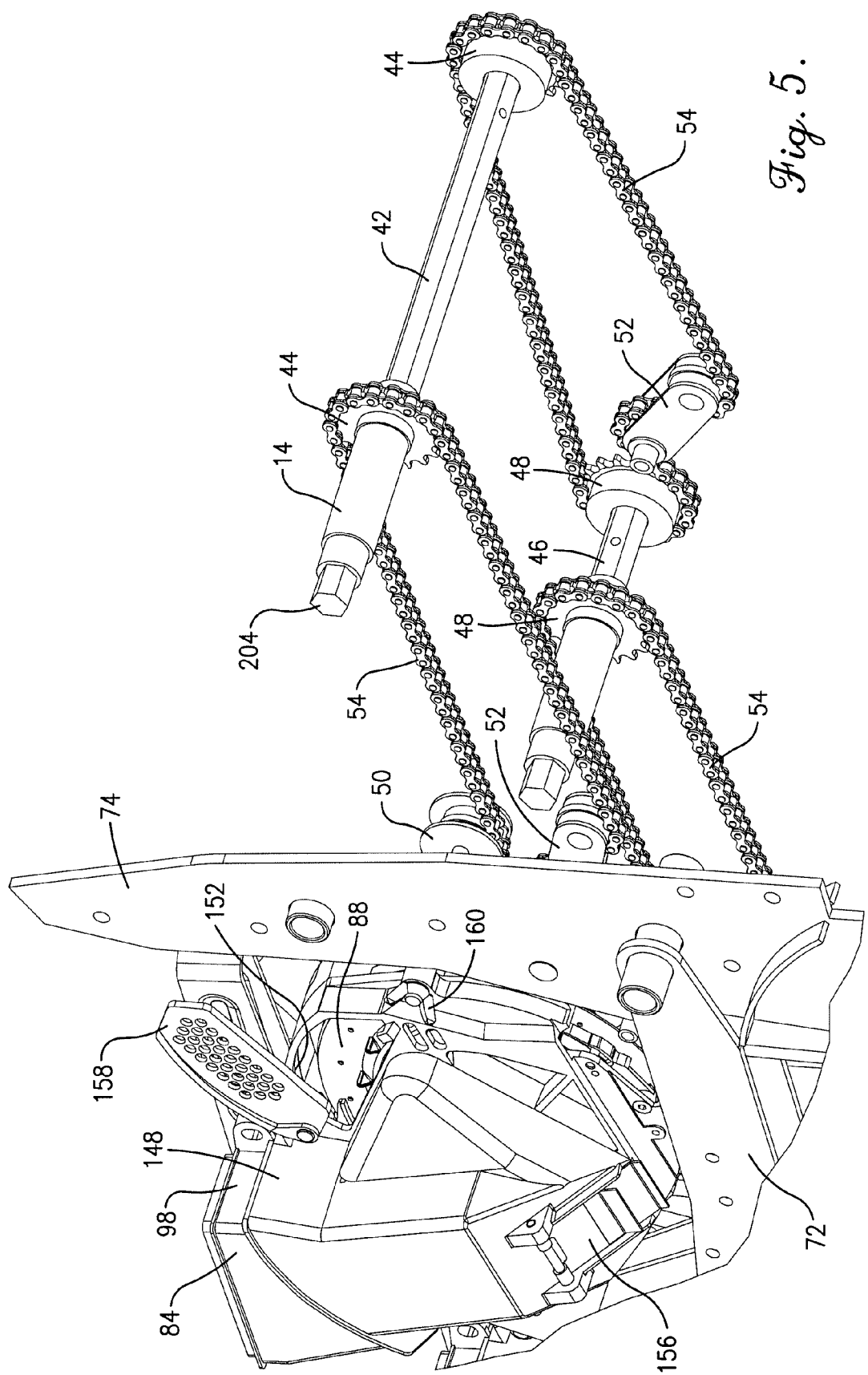
FIG. 5 is a fragmentary perspective view of the twin row planter shown in FIGS. 1-4, showing a drive mechanism and seed metering assembly of the planter.
Figure 6:
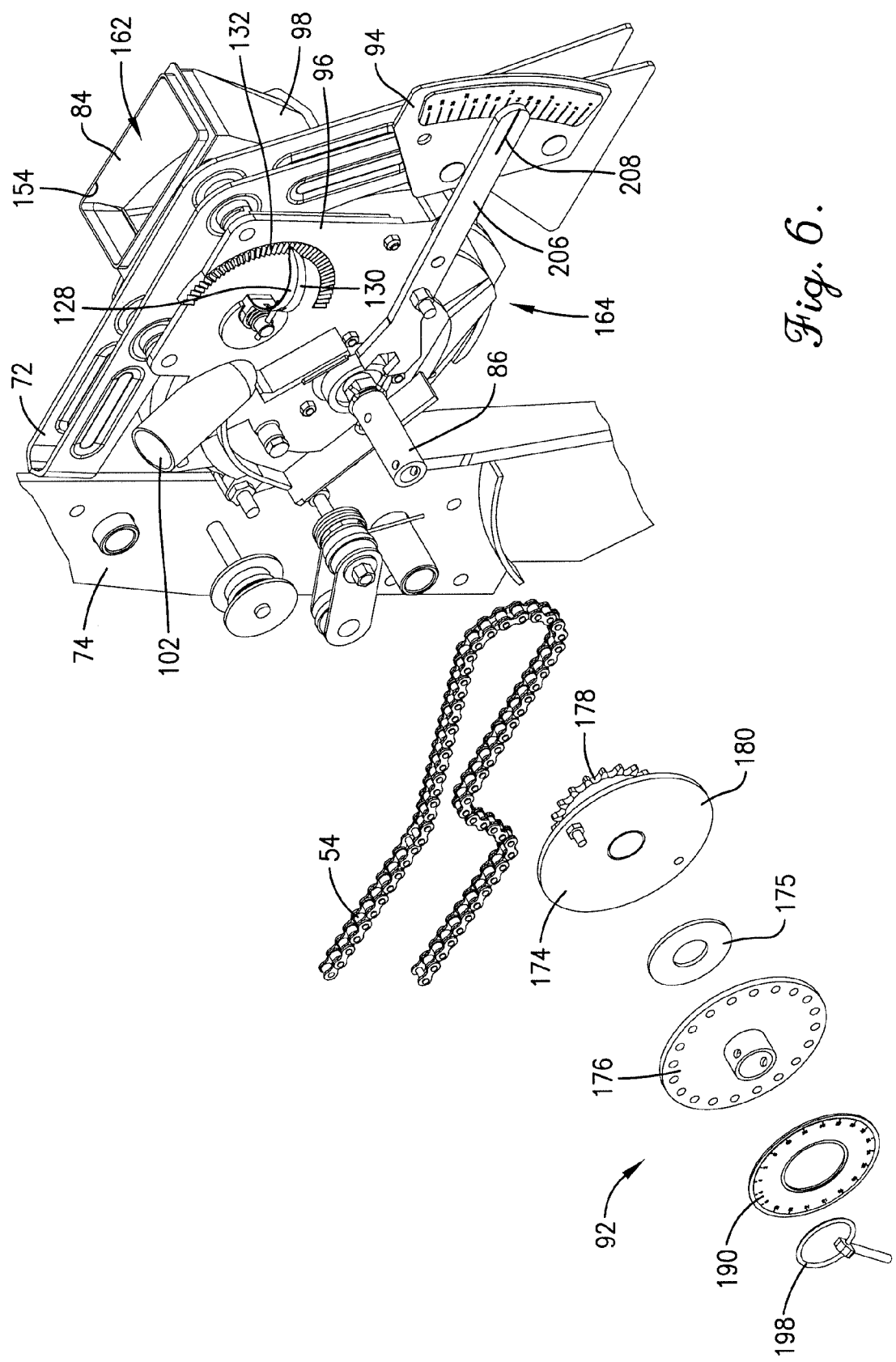
FIG. 6 is an exploded perspective view of the twin row planter shown in FIGS. 1-5, showing an adjustable sprocket assembly of the planter exploded from the corresponding seed metering assembly.

Turning initially to FIG. 1, a twin row agricultural seed planter 10, operable to be pulled by a tractor (not shown), is depicted and is particularly suited for row-crop planting of numerous plant varieties (e.g., soybeans, peanuts, cotton, corn, cucumbers, melons, onions, pumpkins, sorghum, and sunflowers). As will be discussed in greater detail, the illustrated twin row planter 10 provides an optimal spacing between adjacent seeds by planting seeds into a pair of adjacent furrows within a corresponding harvesting row. The twin row planter 10 broadly includes a chassis 12, a drive mechanism 14, and fixed and adjustable planter units 16,18. As will be discussed, the planter units 16,18 cooperatively plant adjacent furrows within the harvesting row and thereby operate as a synchronized twin planter assembly. While only one twin planter assembly is shown in the illustrated seed planter 10, those of ordinary skill in the art will appreciate that as many as eight or twelve of the twin planter assemblies are commonly used in one seed planter 10. The chassis 12 and drive mechanism 14 are conventional components such as those found on the MONOSEM planter available from MONOSEM, Inc. of Lenexa, Kans.

Turning to FIGS. 1-4, the chassis 12 broadly includes, among other things, a tool bar 20 and offset planter attachment assemblies 22,24. The tool bar 20 includes a tubular beam 26 that extends transversely relative to an axial direction of the twin row planter 10 and supports the assemblies 22,24. The assemblies 22,24 each preferably include a pivotal linkage 28. The pivotal linkage 28 includes links 30, a tool bar bracket 32, and U-bolt fasteners 34 for securing the bracket 32. The links 30 are pivotally mounted on the bracket 32 and, as will be discussed, the links 30 are pivotally attached to the corresponding planter unit 16,18.

Those of ordinary skill in the art will appreciate that, while only one pair of attachment assemblies 22,24 are depicted, the twin row planter 10 preferably includes a plurality of attachment assembly pairs spaced along the tool bar 20 for receiving a plurality of twin planter assemblies.

Assembly 24 also includes an offset bracket assembly 36 for spacing the planter units 16,18 axially from one another. The offset bracket assembly 36 includes an elongated body 38 and U-bolt fasteners 40 for attaching the body 38 to the tool bar 20 so that the body 38 is cantilevered therefrom. The pivotal linkage 28 of assembly 24 is attached to a rearwardly-spaced end of the offset bracket assembly 36. The linkage 28 of assembly 22 is attached directly to the tool bar 20 by bracket 32 and U-bolt fasteners 34. Again, the links 30 are interconnected with respective brackets 32 at pinned joints and extend rearwardly therefrom. In this manner, each of the links 30 preferably pivot relative to the tool bar 20 about a corresponding horizontal axis. While each linkage 28 preferably includes a pair of links 30 spaced vertically from one another, it is within the ambit of the present invention where an alternative linkage 28 is used to permit relative vertical movement between the planter units 16,18 and tool bar 20.

The chassis 12 further includes a top tool bar (not shown) that provides a manifold for supplying vacuum to the planter units 16,18. Vacuum is supplied to the planter units 16,18 by a vacuum source (not shown), such as a pump, via corresponding vacuum hoses (not shown).

Turning to FIGS. 1-5, the drive mechanism 14 powers each of the planter units 16,18. The drive mechanism 14 preferably includes a driving connection to ground wheels (not shown) of the planter 10 that serves as the power source for the twin row planter 10. However, it is within the ambit of the present invention where the planter 10 includes an alternative power source. For example, the twin row planter 10 could include a hydraulic motor or a variable speed electric motor for powering the planter 10. Such wheels would be rotatably attached to the chassis 12 and would spin in response to contact with the ground. Further details of a preferred planter with drive wheels are described in U.S. Pat. No. 6,520,100, issued Feb. 18, 2003, entitled TWIN ROW PLANTER, which is hereby incorporated by reference herein.

The drive mechanism 14 also preferably includes a drive shaft 42, drive sprockets 44, driven shaft 46, driven sprockets 48, fixed idlers 50, adjustable idlers 52, and drive chains 54. The shafts 42,46 are rotatably mounted on the chassis 12. The drive shaft 42 is positioned adjacent the tool bar 20 and extends in front of both planter units 16,18. The driven shaft 46 is spaced axially behind the drive shaft 42 and extends primarily in front of planter unit 18. The drive sprockets 44 are mounted on the drive shaft 42, and driven sprockets 48 are mounted on driven shaft 46. One chain 54 drivingly interconnects planter unit 16 and the respective adjacent drive sprocket 44. Two additional chains 54 drivingly interconnect the planter unit 18, the driven sprockets 48, and the respective adjacent drive sprocket 44. While the illustrated sprockets 44,48 and chains 54 are preferred for transmitting power through the drive mechanism 14, the principles of the present invention are applicable where other power transmitting elements are used, such as gear drives or belt-and-pulley drives. As will be discussed, the illustrated drive mechanism 14 preferably drives the planter units 16,18 synchronously (i.e., at the same time).

The planter units 16,18 broadly include a planter frame 56, a depth gauge wheel assembly 58, a furrow opener 60, a furrow closer 62, a seed hopper 64, a seed tube (not shown), and seed metering assemblies 66,68. Except for the seed metering assemblies 66,68, all of the components of planter units 16,18 are conventional such as those found on the MONOSEM planter available from MONOSEM, Inc. The planter unit 18 is preferably axially spaced behind the planter unit 16. More preferably, the illustrated planter unit 18 is axially spaced behind planter unit 16 by 17.75 inches. However, it is within the ambit of the present invention where the planter units 16,18 are positioned with an alternative axial spacing, such as 9 or 25 inches. It is also consistent with the scope of the present invention where the planter unit 18 is spaced ahead of planter unit 16.

The planter frame 56 includes a frame body 72 and a linkage bracket 74 fixed to the body 72. The planter frame 56 further presents an opening for receiving a corresponding one of the seed metering assemblies 66,68. The frame body 72 is preferably a rigid structure with several structural components welded or fastened together.

The planter units 16,18 are pivotally attached to linkage 28. In particular, the linkage bracket 74 is attached to the links 30 at pinned joints so that the planter units 16,18 are shiftable relative to the chassis 12 in a substantially upright direction. In other words, the linkage 28 operates as a four-bar linkage to restrict rotational shifting of the planter units 16,18 while permitting upright shifting thereof.

The gauge wheel assembly 58 includes gauge wheels 76 rotatably mounted on the frame body 72. The gauge wheel assembly 58 is operable to roll on top of a ground surface and thereby maintain the height of the planter unit 16,18 relative to the ground surface. The furrow opener 60 includes a disc 78 rotatably mounted to the frame body 72 for opening the corresponding furrow. The furrow closer 62 is spaced axially behind the furrow opener 60 and includes press wheels 80 pivotally attached to the frame body 72 by arms 82. The seed hopper 64 comprises a container for holding seed (not shown) and is preferably mounted to the frame 56 above the respective metering assembly 66,68 so that seed is fed by gravity into the metering assembly 66,68. While each planter unit 16,18 preferably includes one of the hoppers 64, it is also within the ambit of the present invention where a plurality of planter units 16,18 use a common hopper.

Turning to FIGS. 5-9, the seed metering assemblies 66,68 include a housing 84, a rotatable shaft 86 rotatably mounted in the housing 84, and a metering wheel 88. The seed metering assembly 66 also includes a fixed sprocket assembly 90 (see FIG. 3) for connecting with the drive mechanism 14. As will be discussed in greater detail, the seed metering assembly 68 preferably includes an adjustable sprocket assembly 92 for connecting with the drive mechanism and an angular adjustment indicator 94 (see FIG. 7). The principles of the present invention are also applicable where seed metering assembly 66, or both seed metering assemblies 66,68 include the adjustable sprocket assembly 92.

The housing 84 is operable to substantially enclose the metering wheel 88 and includes a vacuum section 96, a cover section 98, and an insert assembly 100. The vacuum section 96 presents an air vent 102 along an outer side thereof and an inner cavity 104. The vacuum section 96 also includes fixed and rotatable dowel pins 106a,b and threaded studs 108 (see FIG. 8). The rotatable dowel pin 106b includes an eccentric end, the use of which will be described.

The insert assembly 100 includes a plastic annular insert 110 and a circular cap 112. The annular insert 110 presents a circular opening through which the shaft 86 is received and an annular slot 116 that extends around the opening. The cap 112 is partly received within the circular opening and is secured to the vacuum section 96 by fasteners. The insert assembly 100 is received within the inner cavity 104 and is held therein by the cap 112. The vacuum section 96 and insert assembly 100 cooperatively define a vacuum chamber 118, with the slot 116 and air vent 102 preferably forming two openings that fluidly communicate with the chamber 118. However, it is within the ambit of the present invention where the chamber 118 is alternatively configured. The annular insert 110 also serves as a gasket or wear surface for receiving the metering wheel 88.

Figure 8:
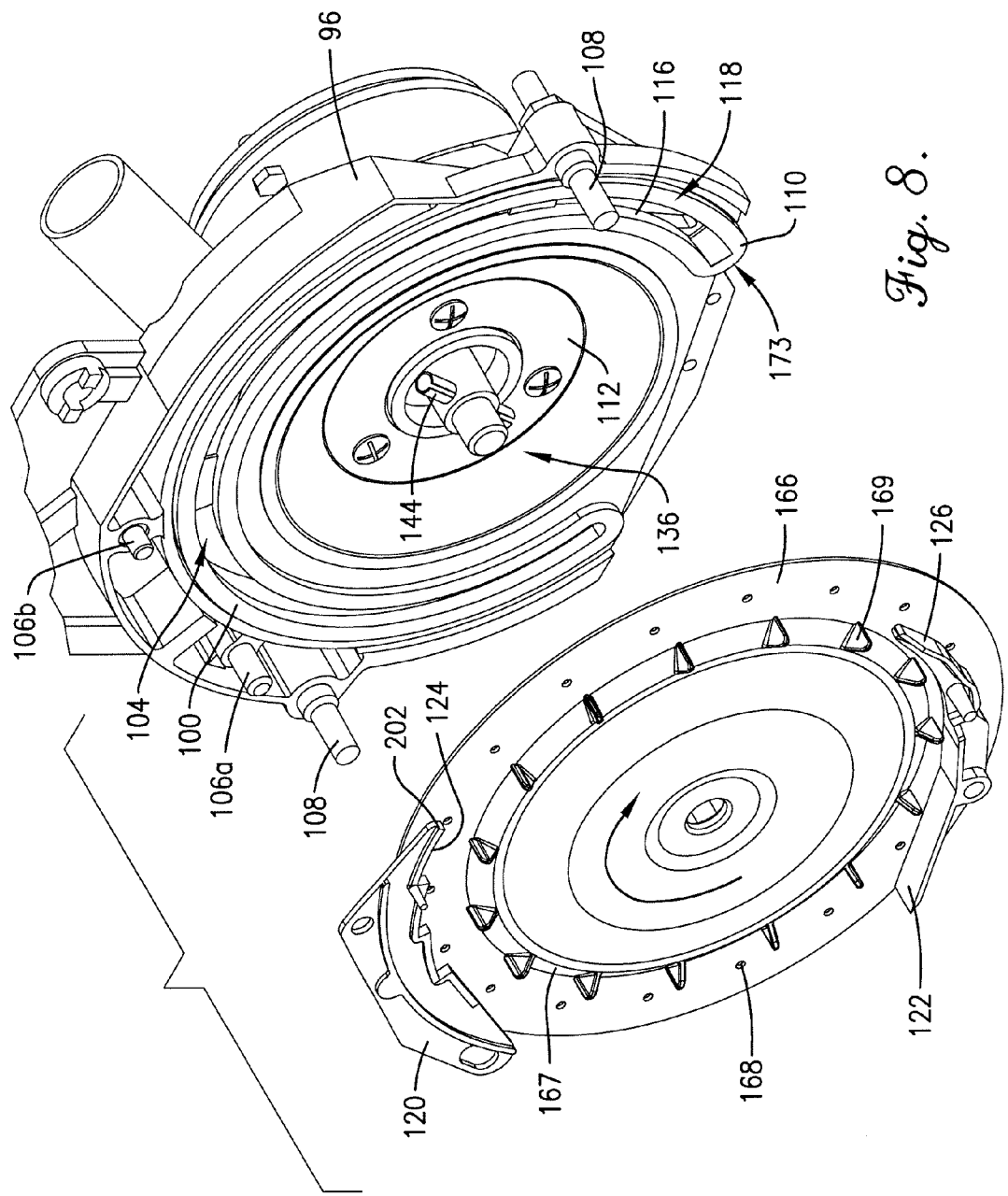
FIG. 8 is a partly exploded view of the seed metering assembly shown in FIGS. 1-7, showing a metering wheel, seed singulator, and deflector block exploded away from a remainder of the seed metering assembly.

Turning to FIG. 8, the housing 84 further includes a seed singulator 120 and a seed deflector block 122. The seed singulator 120 is substantially unitary and includes a serrated edge 124. The seed singulator 120 is mounted onto dowels pins 106a,b adjacent to the metering wheel 88. As the dowel pin 106b is rotated, the eccentric end thereof shifts the singulator 120 relative to the vacuum section 96 to accommodate different sizes of seed, as will be discussed.

The deflector block 122 is unitary and is shiftably mounted adjacent the metering wheel 88. The deflector block 122 presents a sloped edge 126 for deflecting seeds into the seed boot. The deflector block 122 is mounted on an inside surface of the cover section 98.

Turning back to FIGS. 5-9, the housing 84 also includes a vacuum control 128 for adjusting the vacuum level present in the seed metering assembly 66,68. The vacuum control 128 includes a control lever 130 for controlling the vacuum level by selectively opening a vent (not shown). The vacuum control 128 also includes a vacuum adjustment scale 132 presented on an outer surface of the vacuum section 96 for indicating a setting of the control lever 130. The control lever 130 also is interconnected with and is thereby configured to rotate the dowel pin 106b. Correspondingly, the control lever 130 is configured to shift the singulator 120 and adjust the vent at the same time.

The rotatable shaft 86 includes a shaft body 134 presenting inner and outer shaft ends 136,138. The shaft body 134 also comprises an inner shaft portion 135a and an outer sleeve portion 135b that are attached to one another with a roll pin (not shown). The outer sleeve portion 135b of the shaft body 134 presents an annular groove 140 and a hex section 142 spaced between the ends 136,138. The rotatable shaft 86 also includes a spring pin 144 received within a corresponding through-hole and a cotter pin 146 received in the groove 140. The rotatable shaft 86 is rotatably mounted in the vacuum section 96 with the ends 136,138 extending oppositely therefrom.

The cover section 98 includes a unitary wall 148 that presents a seed trap opening (not shown), a view opening 152, and a seed supply opening 154. The cover section 98 also includes a trap door 156 pivotally attached to the wall 148 to selectively cover the seed trap opening. The cover section 98 further includes a control window 158 pivotally attached to the wall 148. The control window 158 is biased by a spring into a position covering the view opening 152. The control window 158 includes a plurality of openings that permit air to pass into the metering assembly 66,68 while the window 158 covers the view opening 152. The control window 158 is selectively openable to view inside the metering assembly 66,68.

The cover section 98 is attachable to the vacuum section 96 by positioning the cover section 98 adjacent thereto so that the threaded studs 108 pass through corresponding holes in the cover section 98. Wing nuts 160 are threaded onto the studs 108 to secure the sections 96,98 to one another and define a seed chamber 162 between the cover section 98 and insert assembly 100. The sections 96,98 cooperatively present a lowermost seed opening 164 that permits seed to be discharged from the seed chamber 162 into the seed boot.

The metering wheel 88 includes a stainless steel seed plate 166 and a circular agitator 167 attached to one another and mounted on the rotatable shaft 86 adjacent the inner end 136 thereof. The seed plate 166 is preferably circular and includes eighteen (18) holes 168 spaced uniformly along the outermost circumference of the seed plate 166 (see FIG. 10) and serve as seed-receiving cells. Each pair of adjacent holes 168 are spaced from one another at a cell angle of twenty degrees. However, the principles of the present invention are applicable where the seed plate 166 includes an alternative number of cells, such as 12, 24, or 36. With the seed plate 166 installed in the metering assembly 66,68, a portion of the holes 168 are spaced adjacent the annular slot 116 at a particular time. The chambers 118,162 fluidly communicate through those holes 168 and the annular slot 116. While the illustrated metering assemblies 66,68 preferably include the illustrated metering wheel 88, the it is also within the scope of the present invention where the metering assemblies 66,68 utilize an alternative metering mechanism, such as a metering wheel with a cup-type seed-securing cell.

The circular agitator 167 is preferably constructed of brass and includes blades 169 that displace seed within the seed chamber 162 and lugs 170 positioned on an opposite side from the blades 169 on the agitator 167. The agitator 167 is fixed to the seed plate 166 by a plurality of fasteners so that the metering wheel 88 operates as a unitary structure.

The metering wheels 88 all preferably include an identical configuration of cells so that seeds are uniformly spaced among furrows. However, the principles of the present invention are also applicable where the metering wheels 88 have different configurations such that planter units 16,18 discharge seed at different seed spacings along a pair of adjacent furrows.

Figure 9:
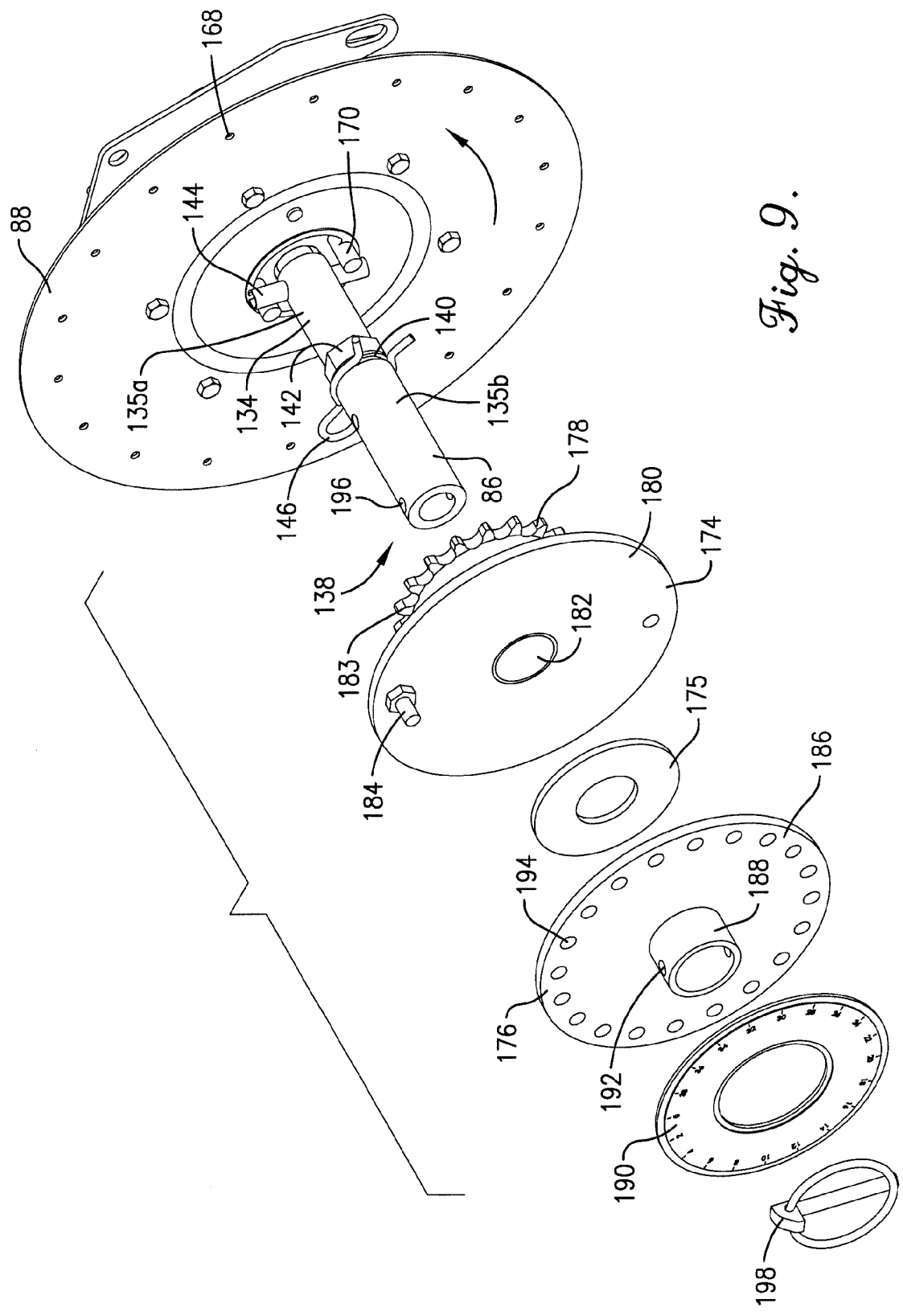
FIG. 9 is a fragmentary exploded view of the seed metering assembly shown in FIGS. 1-8, showing the metering wheel mounted on a rotatable shaft of the metering assembly and the adjustable sprocket assembly exploded away from the shaft.

Turning to FIGS. 8 and 9, the metering wheel 88 is mounted onto shaft 86 adjacent the end 136 thereof, with the spring pin 144 being spaced adjacent the metering wheel 88 and the lugs 170. As the shaft 86 is rotated in the forward direction shown by the arrow, the spring pin 144 engages the lugs 170 and causes the metering wheel 88 to also rotate in the forward direction with the shaft 86. As previously discussed, the metering wheel 88 is received by the annular insert 110 in a sliding relationship, with the insert 110 serving as a gasket and providing a wear surface.

The metering wheel 88 operates by rotating along a forward direction shown by the arrow. The singulator 120 is positioned laterally adjacent and slidably engages the metering wheel 88, with a fine spacing therebetween, so that the serrated edge 124 is positioned adjacent the holes 168. While the singulator 120 preferably contacts the metering wheel 88, it is also within the ambit of the present invention where the singulator 120 is entirely spaced from the metering wheel 88. The singulator 120 is configured to displace seed from the holes 168 so that each hole 168 secures a single seed. As previously discussed, the singulator 120 is configured to be shifted by the control lever 130. More particularly, the singulator 120 is configured to be shifted relative to the cells of the seed plate 166 to accommodate different sizes and shapes of seed while ensuring that only one seed becomes secured within the corresponding cell.

The deflector block 122 is also spaced adjacent the metering wheel 88. The sloped edge 126 extends radially from within the radial position of the holes 168 on the metering wheel 88 to a position outside of the radial position of the holes 168. In this manner, the sloped edge 126 serves to deflect seed from the corresponding hole 168 and direct the seed into the seed boot (not shown).

Figure 7:
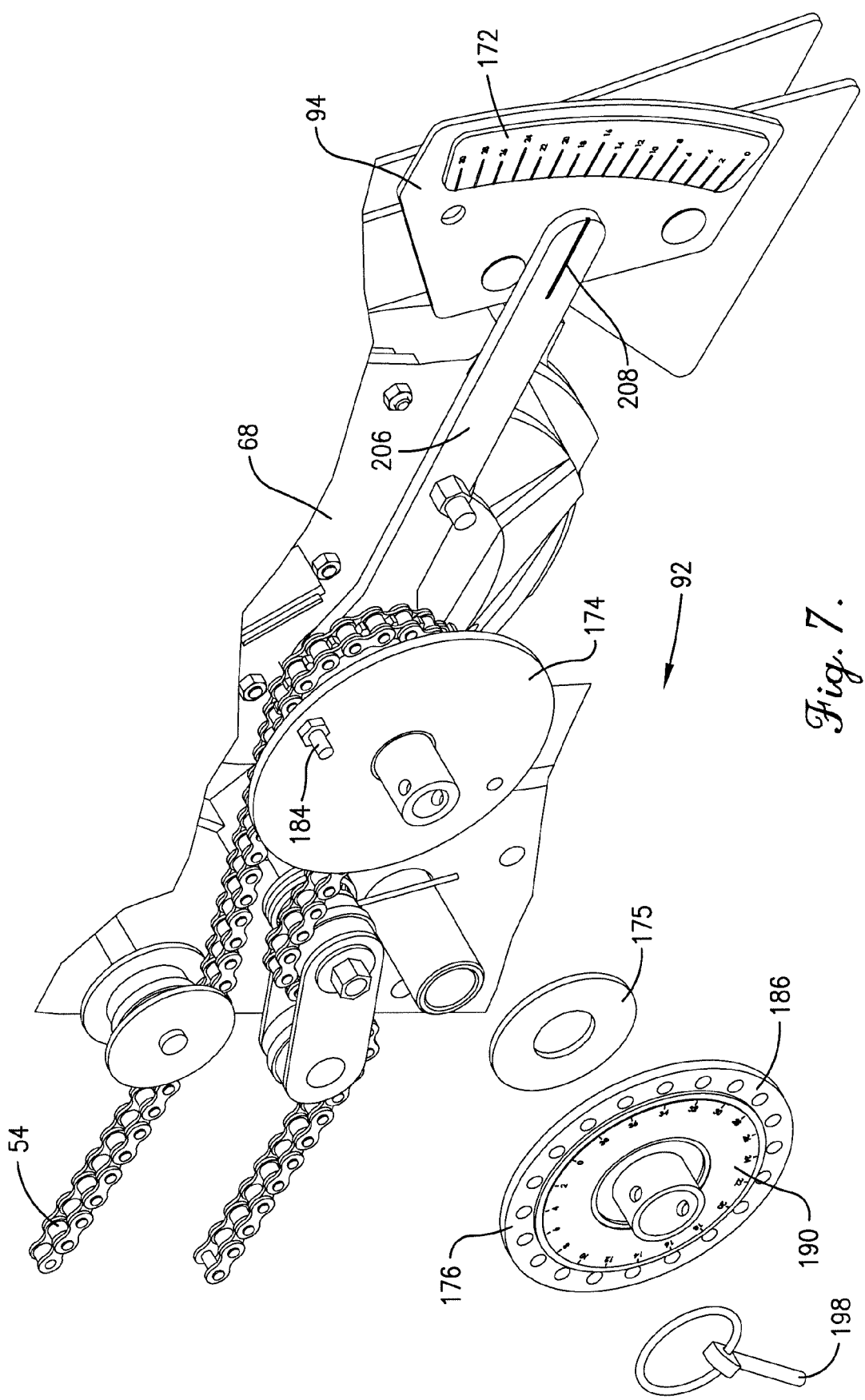
FIG. 7 is an enlarged exploded view of the twin row planter shown in FIGS. 1-6, showing the adjustable sprocket assembly partly exploded from the seed metering assembly.

Turning to FIG. 7, the angular adjustment indicator 94 presents an angular scale 172 along one side thereof for indicating angular offset between the seed metering assemblies 66,68, as will be discussed in greater detail. The illustrated angular scale 172 preferably includes a range of indicator marks from zero (0) degrees angular offset up to thirty (30) degrees angular offset. The angular scale 172 also preferably includes angular indicator marks at two degree increments. However, it is also consistent with the principles of the present invention where the range of indicator marks or their relative spacing are either lesser or greater than the illustrated embodiment. As will be discussed, the illustrated embodiment preferably utilizes indicator marks ranging from "0" to "18".

Turning to FIGS. 1-9, the seed metering assemblies 66,68 are mounted within the corresponding frame 56. With respect to both metering assemblies 66,68, vacuum hoses (not shown) fluidly interconnect the vacuum source and also the air vent 102 on the housing 84 so that the vacuum chamber 118 is operable to be evacuated. The seed chamber 162 is configured to receive seed from the hopper 64. The holes 168 function as a seed-selecting location or cell as vacuum in the vacuum chamber 118 draws air through the holes 168 from the seed chamber 162. In particular, this vacuum-driven selection of seed occurs only along the circumferential length of the annular slot 116. Only along this circumferential length do the chambers 118,162 fluidly communicate. Therefore, as the metering wheel 88 rotates, seed is configured to be secured to the particular cell at a point along the circumferential length of the slot 116 and released adjacent a slot end 173. Thus, seed is discharged from the metering assembly 66,68 at a position adjacent the slot end 173, with the sloped edge 126 deflecting the seed from the corresponding hole 168 into the seed boot (not shown).

Turning to FIGS. 6-9, the adjustable sprocket assembly 92 serves as a connector for adjustably connecting the drive mechanism 14 to the rotatable shaft 86 so that the seed plates 166 of the twin planter assembly are shiftable relative to one another. The adjustable sprocket assembly 92 includes a sprocket plate assembly 174, a spacer 175, and a timing plate assembly 176, with the plate assemblies 174,176 being selectively and adjustably attached to one another.

The sprocket plate assembly 174 includes a sprocket 178 and a plate 180 that are mounted onto and integrally formed with a cylindrical shaft 182. As will be discussed, the illustrated sprocket 178 preferably includes eighteen (18) teeth 183. However, it is also within the ambit of the present invention where the sprocket 178 includes a greater or fewer number of teeth 183. The adjustable sprocket assembly 92 further includes a projection 184 that extends from the plate 180 adjacent the outer circumference of the plate 180 and extends parallel to the shaft axis.

The timing plate assembly 176 includes a timing disk 186, a cylindrical mount 188, and a timing scale 190. The cylindrical mount 188 includes a through-hole 192 that extends transversely to the shaft axis. The timing disk 186 presents twenty (20) indexing holes 194 that are uniformly spaced along the outermost plate circumference, with an eighteen-degree indexing angle between each pair of adjacent holes 194. However, the principles of the present invention are equally applicable where the plate 186 includes an alternative number of indexing holes 194. As will be discussed, the number of indexing holes 194 is preferably greater than the number of holes 168. However, the timing disk 186 could alternatively include a number of indexing holes 194 less than the number of holes 168, although such an arrangement is not shown.

The timing scale 190 is annular and is preferably constructed of a thin magnetic material with a printable overlay adhered thereto. The timing scale 190 includes a plurality of numbered divisions 195 spaced along an outer circumference thereof (see FIGS. 12-14). The divisions 195 are preferably angularly spaced uniformly and at an angle from one another identical to the indexing angle of holes 194 discussed above. Thus, the divisions 195 are configured to identify the indexing holes 194 and to thereby permit a predetermined adjustment of the timing plate assembly 176 relative to the sprocket plate assembly 174. While the divisions 195 are preferably numbered from "0" to "38" in a counterclockwise direction, it is also within the scope of the present invention to number the divisions 195 in an alternative manner. Furthermore, it is also consistent with the principles of the present invention where the timing scale 190 identifies only some of the indexing holes 194, e.g., with divisions 195 numbered from "0" to "18." As will be discussed, the illustrated embodiment only utilizes divisions 195 from "0" to "18."

The timing scale 190 is preferably magnetic so as to be selectively magnetically secured onto the timing disk 186. However, the principles of the present invention are applicable where the timing scale 190 is alternatively removably secured on the timing disk 186. For example, the timing scale 190 could be secured to the timing disk 186 with conventional removable fasteners or the timing scale 190 could take a different form, such as a dial indicator.

The timing plate assembly 176 is received onto the plate 180 by aligning the projection 184 with a selected one of the holes 194 while positioning the shaft 86 within the cylindrical mount 188 and the shaft 182. Thus, the timing plate assembly 176 and the sprocket plate assembly 174 cooperatively provide a clutch that interconnects the shaft 86 and the drive mechanism 14. As will be discussed, the timing plate assembly 176 and sprocket plate assembly 174 can be aligned so that any one of the holes 194 receives the projection 184.

The adjustable sprocket assembly 92 is received onto the shaft 86 by initially mounting the sprocket plate assembly 174 onto the shaft 86 with the plate 180 being outboard of the sprocket 178. The sprocket plate assembly 174 is rotatably mounted onto the shaft 86 and is configured so that the drive chain 54 can be entrained onto the sprocket 178. Thus, the sprocket assemblies 90,92 are drivingly interconnected with the respective drive chains 54. As the drive shaft 42 is rotated, the drive chains 54 rotate the sprocket assemblies 90,92.

The timing plate assembly 176 is also configured to mount on the shaft 86, with one of the holes 194 receiving the projection 184 as discussed above. In this manner, the timing plate assembly 176 and sprocket plate assembly 176 rotate together on the shaft 86. As the through-hole 192 is aligned with a through-hole 196 in the shaft 86, a linch pin 198 can be inserted into both through-holes 192,196 to rotatably lock the shaft 86 to the adjustable sprocket assembly 92. Consequently, the adjustable sprocket assembly 92 becomes fixed to the metering wheel 88 of the seed metering assembly 68. Similarly, the linch pin 198 can be removed to permit relative rotational movement between the shaft 86 and adjustable sprocket assembly 92 as well as removal of the adjustable sprocket assembly 92 entirely from the shaft 86. Again, the drive chains 54 are configured to rotate the sprocket assemblies 90,92 and, in turn, the metering wheels 88 within the seed metering assemblies 66,68.

Figure 10:
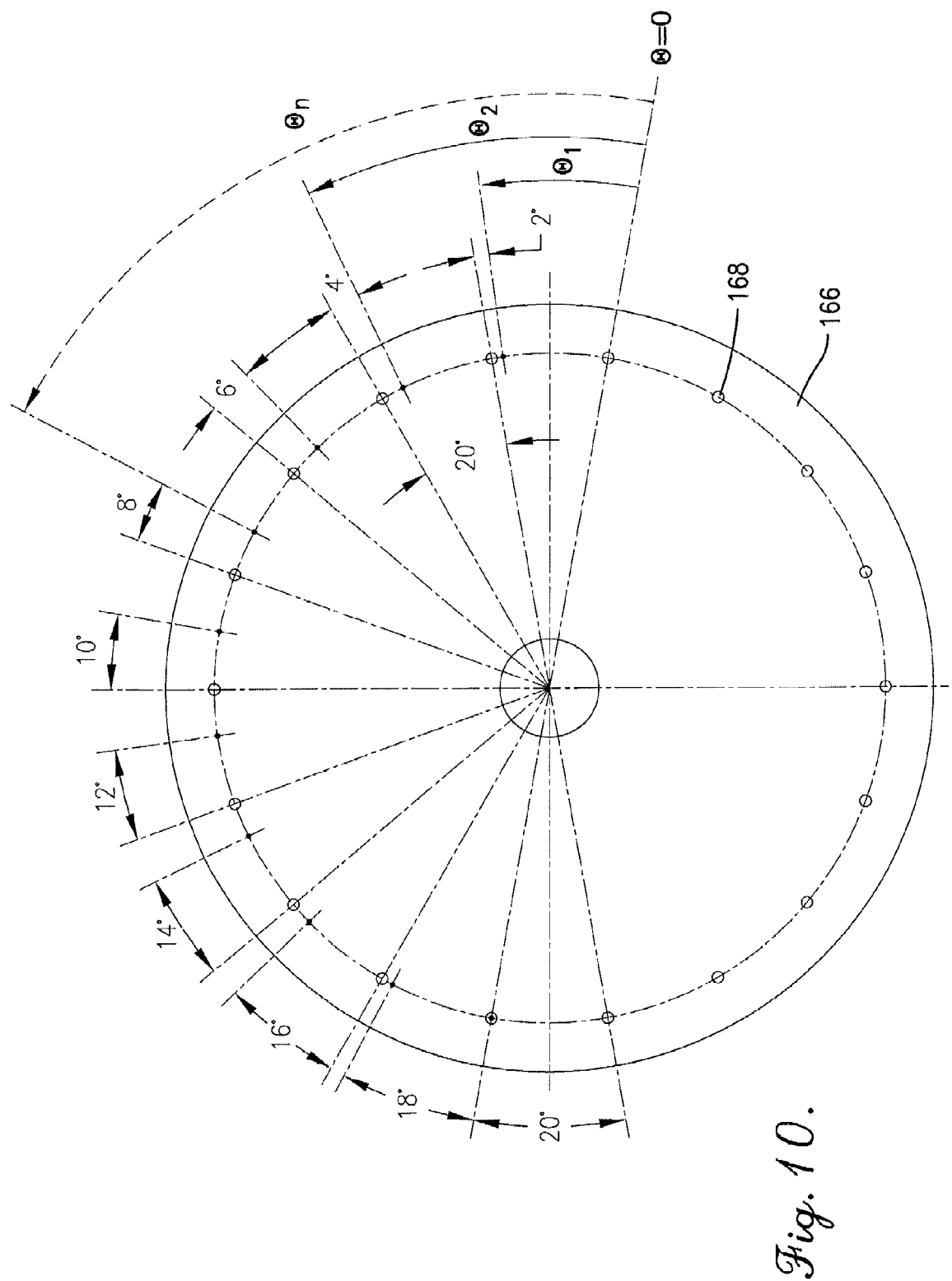
FIG. 10 is a schematic side view of the metering wheel shown in FIGS. 1-9, showing the configuration of seed plate holes and rotational offset locations for each of a plurality of angular offsets.

Turning to FIG. 10, the number and spacing of indexing holes 194 is determined based on the hole configuration for the seed plate 166 and the desired angular offset increment. As discussed, the 18 holes 168 in seed plates 166 are spaced at twenty-degree intervals from one another. The illustrated angular offset increment is two degrees as illustrated by the timing scale 190 and angular scale 172. In the preferred embodiment, the uniform spacing of holes 168 permits the plates 166 to be offset by rotating one of the seed plates 166 through a larger angle $\theta_n$ than the corresponding angular offset. In the illustrated embodiment, the seed plate 166 can be rotated through an angle of twenty minus two degrees (i.e., $\theta_1=18$ degrees) in order to achieve a two degree offset between seed plates 166. Correspondingly, the seed plate 166 can be rotated through an angle of forty minus four degrees (i.e., $\theta_2=36$ degrees) in order to achieve a four degree offset. Thus, for every "n" increment of angular offset (i.e., resulting in an angular offset of "2×n" degrees), the seed plate 166 is rotated through an angle $\theta_n=[(20 \times n)-(2 \times n)]=$"18×n" degrees. In other words, the seed plate 166 is rotated through an angle nine times greater than the desired angular offset. While the seed plates 166 are preferably adjustable at two degree increments relative to one another, it is within the ambit of the present invention where the seed plates 166 are adjustable at other angular offset increments.

The adjustable sprocket assembly 92 and the seed plates 166 cooperatively enable the mechanism discussed above for offsetting the seed metering assemblies 66,68. The indexing holes 194 are spaced at eighteen (18) degree increments, resulting in twenty (20) indexing holes 194. While the preferred configuration of the timing plate assembly 176 and the seed plates results in more indexing holes 194 than holes 168, the principles of the present invention are applicable where there are fewer indexing holes 194 than holes 168. The timing disk 186 includes twenty holes 194 corresponding to various offset angles $\theta_n$ of the seed plates 166. For a given offset angle of the seed plate 166, the timing disk 186 is rotated through an angle nine times greater than the offset angle of the seed plate 166. Thus, a scale ratio can be defined between the angle of rotation for the timing disk 186 and for the seed plate 166. In the illustrated embodiment, the scale ratio is 9:1, but it is also within the ambit of the present invention where the scale ratio ranges between about 5:1 and 20:1. The scale ratio enables a suitable spacing of indexing holes 194 on the timing disk 186 for indexing the seed plate 166 at fine angular offsets. For example, if the timing disk 186 included holes spaced at two-degree increments for positioning the seed plate 166 at corresponding two-degree increments, such a timing disk would need to be substantially larger than in the illustrated embodiment for the indexing holes to fit on the plate, or a more complicated indexing mechanism would be required. While the seed planter 10 preferably includes the illustrated adjustable sprocket assembly 92 for indexing the seed plate 166, it is also within the ambit of the present invention where other mechanisms are used to introduce a desired offset between metering wheels 88 of the planter 10 without adjusting the drive mechanism 14.

The synchronized twin planter assembly is adjustable to plant seeds within a range of seed spacing along a given furrow, preferably between about 6 inches and 20 inches. However, the principles of the present invention are applicable where the seed spacing along a furrow is less than 6 inches or greater than 20 inches.

As previously mentioned, the illustrated sprocket 178 preferably includes 18 teeth 183. More preferably, the sprocket 178 includes the same number of teeth 183 as holes 168 in both seed plates 166. Thus, in the event where the drive chain 54 slips relative to the sprocket 178, the seed plate 166 will shift through an angle equivalent to the cell angle or a multiple thereof, depending on the number of teeth 183 that were skipped. In other words, the uniformly-spaced holes 168 of one seed plate 166 will remain in the same offset angle relative to the other seed plate 166 should the chain 54 skip over one or more teeth 183. While the illustrated sprocket 178 preferably includes eighteen (18) teeth 183, it is also consistent with the principles of the present invention where the sprocket 178 includes an alternative number of teeth 183. For example, if the seed plates 166 each present twelve (12) holes 168, the sprocket 178 could correspondingly include twelve (12) teeth 183 so that inadvertent jumping of the chain 54 would not impact the offset angle of the seed plates 166. Importantly, when the number of teeth 183 and the number of holes 168 are preferably matched, the illustrated adjustable sprocket assembly 92 is required for adjusting the relative offset angle of the seed plates 166. In other words, the chain 54 can no longer be "jumped" relative to the sprocket 178 to adjust the offset angle.

Synchronization of the twin planter assembly is initiated by adjusting the fixed planter unit 16. In particular, the metering wheel 88 is rotated until one of the holes 168 is aligned with an outermost tip 202 of the seed singulator 120 (i.e, the metering wheel 88 is positioned into a zero degree reference position, as shown in FIG. 8). Rotation of the metering wheel 88 is performed by applying a drive adjustment wrench (not shown) to the drive mechanism 14 at a hex end 204 of the drive shaft 42 and rotating the drive shaft 42 in the direction indicated by the arrow shown in FIG. 4. An indexing wrench 206 is positioned on the hex section 142 so that an indicator mark 208 on the wrench 206 points to the angular offset between the metering wheels 88, as indicated on the angular scale 172. If the indicator mark 208 does not point to the angular scale 172, the drive adjustment wrench is rotated until the tip 202 is aligned with the next hole 168 where the mark 208 points to a location on the angular scale 172. With the metering wheel 88 of the fixed planter unit 16 being positioned into the zero degree reference position, the other metering wheel 88 can be adjusted to the desired angular offset.

Figure 11:
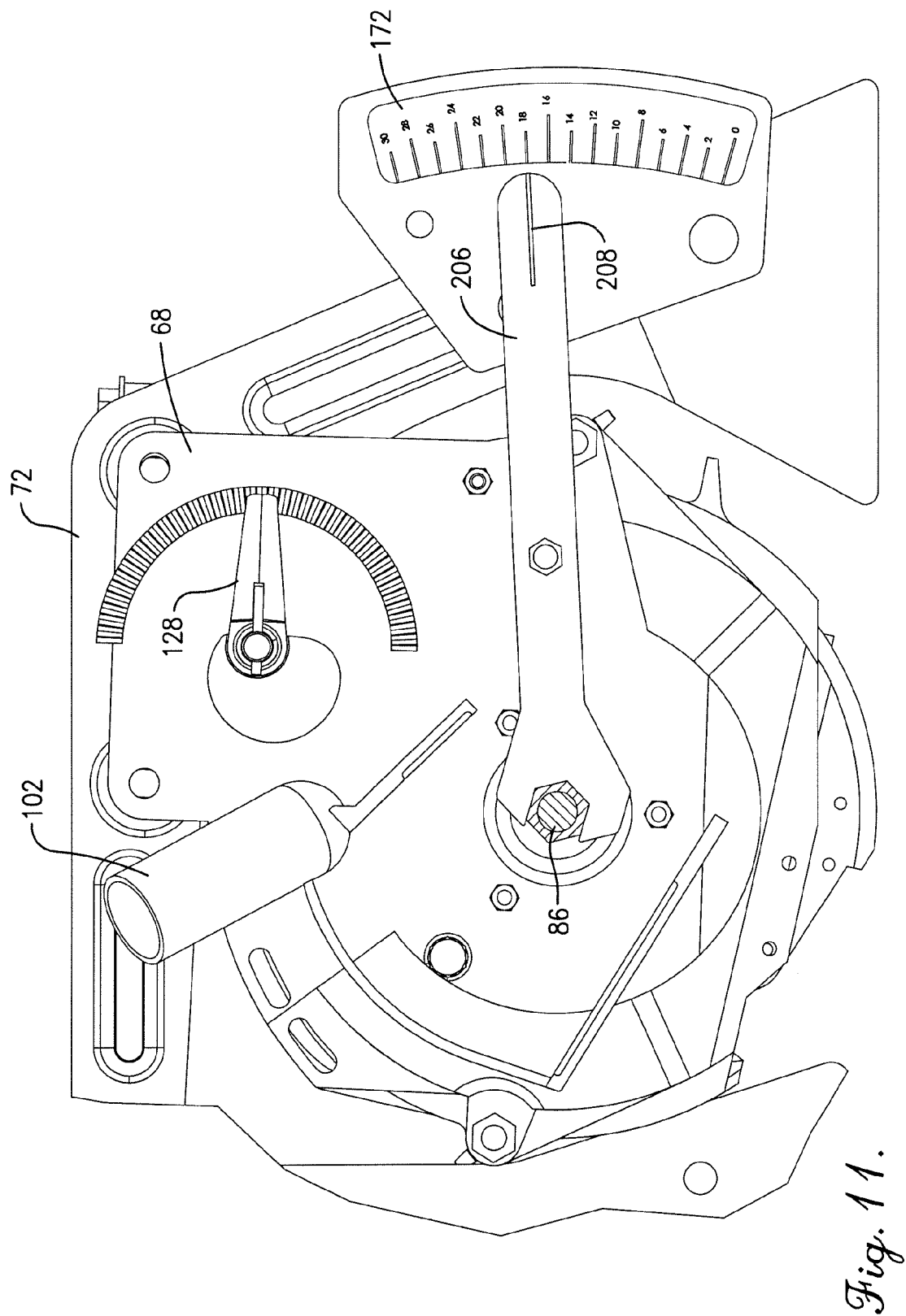
FIG. 11 is an enlarged fragmentary left side view of the twin row planter shown in FIGS. 1-7, showing an indexing wrench installed onto the rotatable shaft and indicating a relative angular offset between a pair of seed metering assemblies that cooperatively plant seeds along a harvesting row.
Figure 12:
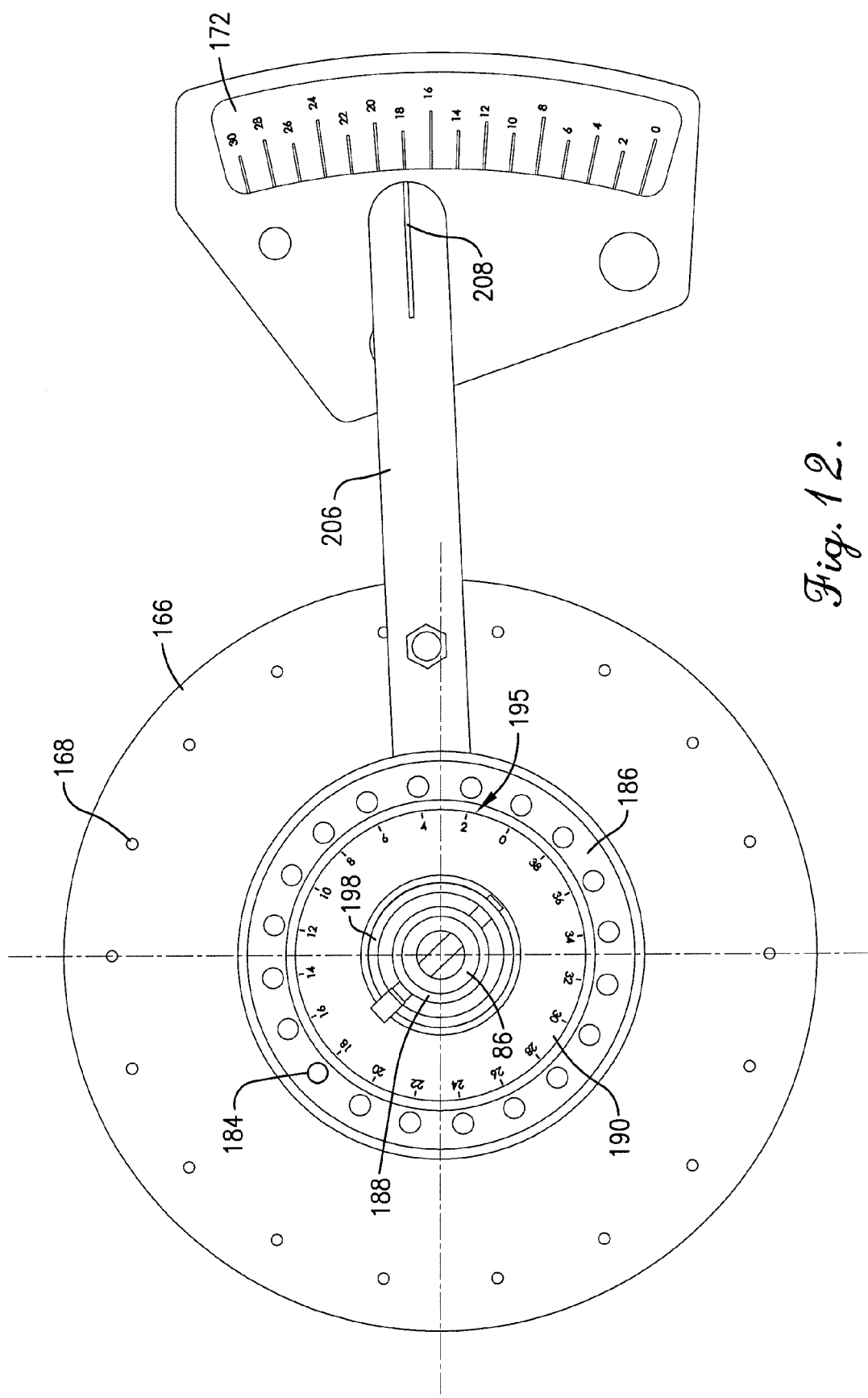
FIG. 12 is an enlarged fragmentary left side view of the seed metering assembly shown in FIGS. 1-7 and 11, showing a timing disk and timing scale of the adjustable sprocket assembly positioned with the angular offset of the seed metering assemblies being at a value of eighteen (18)

Turning to FIGS. 11-14, the angular offset of the seed plates 166 is adjusted by initially determining the pre-existing offset. An indexing wrench 206 is mounted to the hex section 142 as shown in FIG. 11 so that an indicator mark 208 on the wrench 206 points to the angular offset between the metering wheels 88, as indicated on the angular scale 172 (i.e., eighteen (18) degrees in the illustrated embodiment). The timing scale 190 is then indexed to that setting by positioning the scale 190 on the timing disk 186 so that the number indicated on the angular scale 172 ("18" in the illustrated embodiment) is aligned adjacent the projection 184 (see FIG. 12). The desired angular offset is determined from a reference chart shown in Table 1 below. The illustrated reference chart calculates the desired angular offset based on the number of seed-receiving cells N in each seed plate 166, the seed spacing D in each furrow (identified as "Average Seed Distance"), and the axial offset F between seed metering assemblies 66,68 of the seed planter 10 (identified as "Left Twin Row Offset"). Notably, for the illustrated seed plates 166 with eighteen (18) holes 168, the desired angular offset ranges in value in Table 1 from zero (0) to eighteen (18). Thus, as discussed previously, preferably only the corresponding indicator marks on the timing scale 190 and angular scale 172 are utilized. Moreover, the scales could be alternatively configured to identify only the necessary indicator marks (i.e., with the illustrated embodiment, the scales would only have marks ranging from zero (0) to eighteen (18)).

The tabular values illustrated in Table 1 are calculated initially by determining the desired seed spacing D (inches) within each furrow, based on the distance W (inches) from center to center of adjacent harvesting rows and the number S of seeds planted per acre:

$$D = \frac{6272.64 * 100 * 2}{W * S}.$$

TABLE 1

| Average Seed Distance (inch) | NO. OF CELLS | | | |
|---|---|---|---|---|
| | 12 | 18 | 24 | 36 |
| 9" Left Twin Row Offset | | | | |
| 6 | | 0 | 0 | 0 |
| 6⅛ | | 0 | 0 | 0 |
| 6¼ | | 2 | 0 | 0 |
| 6⅜ | | 2 | 2 | 0 |
| 6½ | | 2 | 2 | 2 |
| 6⅝ | | 2 | 2 | 2 |
| 6¾ | | 4 | 2 | 2 |
| 6⅞ | | 4 | 2 | 2 |
| 7 | | 4 | 2 | |
| 7⅛ | | 4 | 4 | |
| 7¼ | | 6 | 4 | |
| 7⅜ | | 6 | 4 | |
| 7½ | | 4 | 4 | |
| 7⅝ | | 6 | 4 | |
| 7¾ | | 6 | 4 | |
| 7⅞ | | 8 | 4 | |
| 8 | | 8 | 4 | |
| 8⅛ | | 8 | 6 | |
| 8¼ | | 8 | 6 | |
| 8⅜ | | 8 | 6 | |
| 8½ | | 8 | 6 | |
| 8⅝ | | 10 | 6 | |
| 8¾ | | 10 | 6 | |
| 8⅞ | | 10 | 6 | |
| 9 | 12 | 10 | 6 | |
| 9⅛ | 14 | 10 | 6 | |
| 9¼ | 14 | 10 | 8 | |
| 9⅜ | 14 | 10 | 8 | |
| 9½ | 14 | 12 | 8 | |
| 9⅝ | 14 | 12 | 8 | |
| 9¾ | 14 | 12 | 8 | |
| 9⅞ | 16 | 12 | 8 | |
| 10 | 16 | 12 | 8 | |
| 10¼ | 16 | 12 | 8 | |
| 10½ | 16 | 12 | 8 | |
| 10¾ | 18 | 12 | 8 | |
| 11 | 18 | 14 | 8 | |
| 11¼ | 18 | 14 | 10 | |
| 11½ | 18 | 14 | 10 | |
| 11¾ | 20 | 14 | | |
| 12 | 20 | 16 | | |
| 12¼ | 20 | 16 | | |
| 12½ | 20 | 16 | | |
| 12¾ | 20 | 16 | | |
| 13 | 20 | 18 | | |
| 13¼ | 22 | 18 | | |
| 13½ | 22 | 18 | | |
| 13¾ | 22 | 18 | | |
| 14 | 22 | 18 | | |

TABLE 1-continued

| Average Seed Distance (inch) | NO. OF CELLS | | | |
|---|---|---|---|---|
| | 12 | 18 | 24 | 36 |
| 14¼ | 22 | 18 | | |
| 14½ | 22 | 18 | | |
| 14 | 22 | 18 | | |
| 15 | 24 | 18 | | |
| 15¼ | 24 | | | |
| 15½ | 24 | | | |
| 15¾ | 24 | | | |
| 16 | 24 | | | |
| 16¼ | 24 | | | |
| 16½ | 24 | | | |
| 16¾ | 0 | | | |
| 17 | 0 | | | |
| 17¼ | 0 | | | |
| 17½ | 0 | | | |
| 17¾ | 0 | | | |
| 18 | 0 | | | |
| 18½ | 0 | | | |
| 19 | 0 | | | |
| 19½ | 0 | | | |
| 20 | 2 | | | |
| 17.75" Left Twin Row Offset | | | | |
| 6 | | 10 | 8 | 6 |
| 6⅛ | | 12 | 8 | 6 |
| 6¼ | | 14 | 8 | 6 |
| 6⅜ | | 14 | 10 | 8 |
| 6½ | | 16 | 10 | 8 |
| 6⅝ | | 16 | 2 | 8 |
| 6¾ | | 18 | 2 | 8 |
| 6⅞ | | 18 | 2 | 10 |
| 7 | | 20 | 2 | |
| 7⅛ | | 0 | 4 | |
| 7¼ | | 2 | 4 | |
| 7⅜ | | 2 | 4 | |
| 7½ | | 2 | 4 | |
| 7⅝ | | 4 | 4 | |
| 7¾ | | 4 | 4 | |
| 7⅞ | | 4 | 4 | |
| 8 | | 6 | 4 | |
| 8⅛ | | 6 | 6 | |
| 8¼ | | 6 | 6 | |
| 8⅜ | | 8 | 6 | |
| 8½ | | 8 | 6 | |
| 8⅝ | | 8 | 6 | |
| 8¾ | | 10 | 6 | |
| 8⅞ | | 10 | 6 | |
| 9 | 14 | 10 | 6 | |
| 9⅛ | 14 | 12 | 6 | |
| 9¼ | 16 | 12 | 8 | |
| 9⅜ | 16 | 12 | 8 | |
| 9½ | 18 | 12 | 8 | |
| 9⅝ | 18 | 14 | 8 | |
| 9¾ | 18 | 14 | 8 | |
| 9⅞ | 18 | 14 | 8 | |
| 10 | 18 | 14 | 8 | |
| 10¼ | 20 | 16 | 8 | |
| 10½ | 22 | 16 | 8 | |
| 10¾ | 22 | 16 | 8 | |
| 11 | 24 | 18 | 8 | |
| 11¼ | 24 | 18 | 10 | |
| 11½ | 24 | 20 | 10 | |
| 11¾ | 26 | 20 | | |
| 12 | 0 | 0 | | |
| 12¼ | 2 | 2 | | |
| 12½ | 2 | 2 | | |
| 12¾ | 2 | 2 | | |
| 13 | 4 | 2 | | |
| 13¼ | 4 | 4 | | |
| 13½ | 4 | 4 | | |
| 13¾ | 6 | 4 | | |
| 14 | 6 | 4 | | |
| 14¼ | 6 | 6 | | |
| 14½ | 8 | 6 | | |
| 14 | 8 | 6 | | |
| 15 | 8 | 6 | | |
| 15¼ | 8 | | | |
| 15½ | 10 | | | |
| 15¾ | 10 | | | |
| 16 | 10 | | | |
| 16¼ | 10 | | | |
| 16½ | 12 | | | |
| 16¾ | 12 | | | |
| 17 | 12 | | | |
| 17¼ | 12 | | | |
| 17½ | 12 | | | |
| 17¾ | 12 | | | |
| 18 | 14 | | | |
| 18½ | 14 | | | |
| 19 | 14 | | | |
| 19½ | 16 | | | |
| 20 | 16 | | | |
| 25" Left Twin Row Offset | | | | |
| 6 | | 6 | 4 | 4 |
| 6⅛ | | 8 | 6 | 4 |
| 6¼ | | 10 | 6 | 6 |
| 6⅜ | | 12 | 8 | 6 |
| 6½ | | 14 | 8 | 6 |
| 6⅝ | | 14 | 10 | 8 |
| 6¾ | | 16 | 10 | 8 |
| 6⅞ | | 18 | 12 | 8 |
| 7 | | 18 | 12 | |
| 7⅛ | | 20 | 12 | |
| 7¼ | | 2 | 0 | |
| 7⅜ | | 2 | 2 | |
| 7½ | | 4 | 2 | |
| 7⅝ | | 4 | 2 | |
| 7¾ | | 6 | 4 | |
| 7⅞ | | 6 | 4 | |
| 8 | | 8 | 4 | |
| 8⅛ | | 8 | 6 | |
| 8¼ | | 10 | 6 | |
| 8⅜ | | 10 | 6 | |
| 8½ | | 12 | 8 | |
| 8⅝ | | 12 | 8 | |
| 8¾ | | 12 | 8 | |
| 8⅞ | | 14 | 8 | |
| 9 | 12 | 14 | 10 | |
| 9⅛ | 14 | 16 | 10 | |
| 9¼ | 14 | 16 | 10 | |
| 9⅜ | 14 | 18 | 10 | |
| 9½ | 14 | 18 | 12 | |
| 9⅝ | 14 | 18 | 12 | |
| 9¾ | 14 | 18 | 12 | |
| 9⅞ | 16 | 20 | 12 | |
| 10 | 16 | 0 | 0 | |
| 10¼ | 16 | 2 | 0 | |
| 10½ | 16 | 2 | 2 | |
| 10¾ | 18 | 4 | 2 | |
| 11 | 18 | 4 | 2 | |
| 11¼ | 18 | 6 | 4 | |
| 11½ | 18 | 6 | 4 | |
| 11¾ | 20 | 8 | | |
| 12 | 20 | 8 | | |
| 12¼ | 20 | 10 | | |
| 12½ | 20 | 10 | | |
| 12¾ | 20 | 10 | | |
| 13 | 20 | 12 | | |
| 13¼ | 22 | 12 | | |
| 13½ | 22 | 12 | | |
| 13¾ | 22 | 14 | | |
| 14 | 22 | 14 | | |
| 14¼ | 22 | 14 | | |
| 14½ | 22 | 16 | | |
| 14 | 24 | 18 | | |
| 15 | 24 | 18 | | |

TABLE 1-continued

| Average Seed Distance (inch) | NO. OF CELLS | | | |
|---|---|---|---|---|
| | 12 | 18 | 24 | 36 |
| 15¼ | | | 24 | |
| 15½ | | | 24 | |
| 15¾ | | | 24 | |
| 16 | | | 24 | |
| 16¼ | | | 24 | |
| 16½ | | | 24 | |
| 16¾ | | | 0 | |
| 17 | | | 0 | |
| 17¼ | | | 0 | |
| 17½ | | | 0 | |
| 17¾ | | | 0 | |
| 18 | | | 0 | |
| 18½ | | | 0 | |
| 19 | | | 0 | |
| 19½ | | | 0 | |
| 20 | | | 2 | |

Based on values known for D as well as the number of plate cells N and the axial offset F (inches) between adjacent planter units, a required relative angular position G (degrees) between seed plates 166, as illustrated by the values tabulated in Table 1, can be determined as:

$$G = \frac{C*360}{D*N},$$

where C=0 if K=D/2, or C=D/2−K if K<D/2, or C=3/2*D−K if K>D/2. K is an intermediate value determined as follows: K=F if F<D, or K=F−D if F/2<D=<F, or K=F−2*D if F/3<D=<F/2, or K=F−3*D if F/4<D=<F/3, or K=F−4*D if F/5<D=<F/4. Thus, the required relative angular position G is an ideal relative angular position of the seed plates 166 that is calculated based upon the above referenced parameters.

Turning to FIGS. 13 and 14, when the desired angular offset is determined (twelve degrees in the illustrated embodiment), the timing disk 186 and timing scale 190 are indexed to that setting by being rotated together (in the direction of the arrow indicated in FIG. 14) until the projection 184 is aligned with the corresponding setting on the timing scale 190 (i.e., "12"). As a consequence, the through-holes 192,196 become misaligned and require the seed plate 166 and shaft 86 to be rotated until the through-holes 192,196 are aligned once again. The linch pin 198 can subsequently be secured in the through-holes 192,196 to permit operation of the planter 10.

In operation, the planter 10 discharges seed into adjacently-spaced furrows. Along the axial direction of the harvesting row, the planter units 16,18 preferably plant seed in an alternating pattern between the furrows so as to plant a large quantity of seed along the harvesting row while maintaining a desired spacing between adjacent seeds. In other words, the axial spacing of seeds (considering both furrows) along the harvesting row preferably is uniform. Prior to planting, this synchronized operation of the planter units 16,18 is established by adjusting the relative timing of seed discharge between the units 16,18. In particular, the metering assembly 68 is adjustable so that the metering assemblies 66,68 discharge seeds into the alternating pattern.

During the planting operation, seed is fed by gravity from the hopper 64 into the seed chamber 162. Vacuum in the vacuum chamber 118 evacuates the seed chamber 162 and encourages the seed into engagement with the holes 168 so that each of the holes 168 function as a seed-selecting location or cell. As mentioned previously, the seed remains engaged with the respective holes 168 until it reaches the slot end 200 and the sloped edge 126 deflects the seed from the corresponding hole 168 into the seed boot.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A twin row seed planter comprising:
a pair of planting units operable to seed a pair of closely-spaced adjacent furrows forming a single harvesting row, with a first one of the planting units corresponding with a first one of the furrows and a second one of the planting units corresponding with a second one of the furrows,
said first planting unit including a first rotatable metering wheel having a plurality of circumferentially spaced seed-receiving first cells,
said second planting unit including a second rotatable metering wheel having a plurality of circumferentially spaced seed-receiving second cells, with the second metering wheel being positioned relative to the first metering wheel to present an angular relationship between the first and second cells; and
a drive mechanism operable to supply power to the planting units so as to cause rotation of the wheels,
said second metering wheel being drivingly disconnectable from the drive mechanism and repositionable relative to the first metering wheel to adjust the angular relationship between the first and second cells so as to vary spacing of the seed in the second furrow relative to seed in the first furrow.

2. The twin row seed planter as claimed in claim 1,
said second planting unit including a drive connector that releasably drivingly interconnects the second metering wheel and the drive mechanism,
said drive connector providing a number of connection positions for the second metering wheel, with shifting of the second metering wheel amongst the connection positions causing adjustment of the angular relationship between the cells.

3. The twin row seed planter as claimed in claim 2,
said second planting unit including a driven shaft, with the second metering wheel and the drive connector being mounted thereon.

4. The twin row seed planter as claimed in claim 2,
said drive connector being partly disconnectable from the drive mechanism to permit shifting of the second metering wheel amongst the connection positions.

5. The twin row seed planter as claimed in claim 2,
said drive connector comprising a clutch with a pair of complemental timing elements, said timing elements being selectively interconnectable at a plurality of angularly offset indexing locations corresponding to the connection positions of the second metering wheel, such that as the timing elements are indexed between the locations the position of the second metering wheel is varied relative to the first metering wheel.

6. The twin row seed planter as claimed in claim 5, said timing elements being relatively shiftable while one of the elements remains drivingly connected to the drive mechanism.

7. The twin row seed planter as claimed in claim 5, said metering wheels having an identical number of seed-receiving cells,
said seed-receiving cells being angularly uniformly distributed about the corresponding metering wheel,
said plurality of indexing locations being angularly uniformly distributed about a corresponding one of the timing elements.

8. The twin row seed planter as claimed in claim 7, said plurality of indexing locations being greater in number than the plurality of seed-receiving cells of each metering wheel.

9. The twin row seed planter as claimed in claim 8, said cells on each metering wheel being spaced from one another at a cell angle,
said plurality of indexing locations being spaced from one another at an indexing angle,
said second planting unit defining an angular offset increment for adjusting the second metering wheel,
said indexing angle being the difference between the cell angle and the angular offset increment.

10. The twin row seed planter as claimed in claim 8, said identical number of seed-receiving cells being 18.

11. The twin row seed planter as claimed in claim 10, said plurality of indexing locations being 20.

12. The twin row seed planter as claimed in claim 5, said drive mechanism including an endless element drivingly connected to one of the timing elements,
said second metering wheel being repositionable relative to the first metering wheel while maintaining the relative position of the endless element and the one of the timing elements constant.

13. The twin row seed planter as claimed in claim 12, said one of the timing elements including a sprocket,
said endless element comprising a chain entraining the sprocket.

14. The twin row seed planter as claimed in claim 13, said metering wheels having an identical number of seed-receiving cells,
said sprocket including a plurality of teeth equal in number to the number of seed-receiving cells on each of the metering wheels.

15. The twin row seed planter as claimed in claim 14, said sprocket including 18 teeth.

16. The twin row seed planter as claimed in claim 12, said drive mechanism including a second endless element, with each endless element being drivingly interconnected with only a respective one of the planting units.

17. The twin row seed planter as claimed in claim 16, said drive mechanism including a drive shaft drivingly interconnecting the endless elements.

18. The twin row seed planter as claimed in claim 5, one of said timing elements including a timing scale that identifies the indexing locations.

19. The twin row seed planter as claimed in claim 18, said scale being removably mounted to the one timing element, so that the scale can be initially positioned to represent a reference angular relationship between the timing elements and then the timing elements can be relatively adjusted using the scale to a relatively offset angular relationship to consequently reposition the second metering wheel.

20. The twin row seed planter as claimed in claim 18, another of said timing elements including a projection, said one timing element including a plurality of angularly spaced holes, each corresponding with one of the indexing locations and being configured to receive the projection therein.

21. The twin row seed planter as claimed in claim 20, said timing scale including divisions that are angularly spaced an amount equal to that of the holes.

22. The twin row seed planter as claimed in claim 18, said at least one of the planting units including an angular scale operable to indicate the angular relationship between the cells of the seed metering wheels.

23. The twin row seed planter as claimed in claim 22, said angular scale including equally angularly spaced divisions for measuring the angular relationship between the cells of the seed metering wheels.

24. The twin row seed planter as claimed in claim 23, said indexing locations being angularly offset to a greater degree than the divisions so as to present a scale ratio, said scale ratio being between about 5:1 and 20:1.

25. The twin row seed planter as claimed in claim 24, said scale ratio being 9:1.

26. The twin row seed planter as claimed in claim 1, said metering wheels having an identical number of seed-receiving cells,
said identical number of seed-receiving cells being selected from the group consisting of 18 and 36 locations.

27. The twin row seed planter as claimed in claim 1; and a vacuum source fluidly communicating with the planting units,
said planting units each including a seed metering housing with a housing cavity,
said metering wheels being spaced within the seed metering housing and dividing the housing cavity into a seed-containing portion and a vacuum-containing portion,
said cells being through-holes extending through the metering wheel for permitting the portions to be in fluid communication,
said vacuum source and seed plate configured to cooperatively secure seeds adjacent the holes and selectively discharge seeds.

28. A method of adjusting the seed stagger between a pair of closely-spaced adjacent furrows planted by respective planting units of a twin row planter, wherein each of the planting units includes a rotatable seed metering wheel, said seed stagger adjustment method comprising the steps of:
  (a) determining an initial angular relationship between the seed metering wheels of the planting units;
  (b) comparing the initial angular relationship with an adjusted angular relationship corresponding to a desired seed stagger between the furrows; and
  (c) relatively shifting the seed metering wheels from the initial angular relationship to the adjusted angular relationship.

29. The seed stagger adjustment method as claimed in claim 28,
   step (a) including the steps of positioning one of the seed metering wheels at a reference location and then measuring the relative angular offset of the other seed metering wheel.

30. The seed stagger adjustment method as claimed in claim 29,
   step (a) including the step of using an angular scale to measure the angular offset of the other seed metering wheel relative to the one seed metering wheel.

31. The seed stagger adjustment method as claimed in claim 29,
   step (c) being performed while the one seed metering wheel is maintained in the reference location, wherein relative shifting between the wheels is effected by shifting the other seed metering wheel relative to the one seed metering wheel.

32. The seed stagger adjustment method as claimed in claim 31,
   step (c) being performed while a planter drive mechanism operable to power the seed metering wheels is maintained in a substantially stationary condition.

33. The seed stagger adjustment method as claimed in claim 28,
   step (b) including the step of computing the adjusted angular relationship from a comparison of the number of seed-receiving cells in the metering wheels, a fore-and-aft offset distance between the planting units, and the seed spacing in each furrow.

34. The seed stagger adjustment method as claimed in claim 33,
   step (b) including the step of identifying the adjusted angular relationship on a table, wherein the adjusted angular relationship is associated with the desired seed stagger.

35. The seed stagger adjustment method as claimed in claim 33,
   said desired seed stagger corresponding to equal seed spacing between the furrows, as measured in the direction of the furrows.

36. The seed stagger adjustment method as claimed in claim 28,
   step (c) including the steps of drivingly disconnecting one of the seed metering wheels from a planter drive mechanism operable to power the seed metering wheels, rotating the one seed metering wheel relative to the other seed metering wheel to achieve the adjusted angular relationship, and reconnecting the one seed metering wheel to the drive mechanism.

37. The seed stagger adjustment method as claimed in claim 36,
   said reconnecting step including the step of positioning the one seed metering wheel at one of a plurality of angularly offset connection positions, wherein one of the connection positions corresponds with the initial angular relationship and another one of the connection positions corresponds with the adjusted angular relationship.

38. The seed stagger adjustment method as claimed in claim 37,
   said disconnecting and reconnecting steps being performed by disengaging and engaging a clutch that defines the connection positions of the one seed metering wheel.

39. The seed stagger adjustment method as claimed in claim 38,
   said rotating step including the step of rotatably indexing a first timing element of the clutch relative to a second timing element of the clutch.

40. The seed stagger adjustment method as claimed in claim 39,
   said indexing step including selectively connecting the timing elements at one of a plurality of angularly offset indexing locations corresponding to the connection positions of the one seed metering wheel.

* * * * *